United States Patent
Cooperstone et al.

(10) Patent No.: US 7,636,665 B2
(45) Date of Patent: Dec. 22, 2009

(54) METHOD AND SYSTEM FOR REMOTELY MANAGING BUSINESS AND EMPLOYEE ADMINISTRATION FUNCTIONS

(75) Inventors: Elliot Cooperstone, Stamford, CT (US); H. Thach Pham, Stamford, CT (US)

(73) Assignee: Intuit Inc., Mountain View, CA (US)

( * ) Notice: Subject to any disclaimer, the term of this patent is extended or adjusted under 35 U.S.C. 154(b) by 1258 days.

(21) Appl. No.: 09/755,934

(22) Filed: Jan. 4, 2001

(65) Prior Publication Data
US 2002/0022982 A1    Feb. 21, 2002

Related U.S. Application Data

(60) Provisional application No. 60/174,480, filed on Jan. 4, 2000.

(51) Int. Cl.
*G06Q 99/00*     (2006.01)
(52) U.S. Cl. .......................................................... 705/1
(58) Field of Classification Search ...................... 705/1
See application file for complete search history.

(56) References Cited

U.S. PATENT DOCUMENTS

| | | | |
|---|---|---|---|
| 4,346,442 A | 8/1982 | Musmanno | 364/408 |
| 4,648,037 A | 3/1987 | Valentino | 364/408 |
| 4,750,121 A | 6/1988 | Halley et al. | 364/408 |
| 4,969,094 A | 11/1990 | Halley et al. | 364/408 |
| 5,136,502 A | 8/1992 | Van Remortel et al. | 364/413.01 |
| 5,429,506 A | 7/1995 | Brophy et al. | 434/107 |
| 5,590,037 A | 12/1996 | Ryan et al. | 395/204 |
| 5,897,620 A | 4/1999 | Walker et al. | 705/5 |
| 5,913,061 A * | 6/1999 | Gupta et al. | 719/310 |
| 5,913,198 A | 6/1999 | Banks | 705/4 |
| 5,960,411 A | 9/1999 | Hartman et al. | 705/26 |
| 5,966,693 A | 10/1999 | Burgess | 705/4 |
| 5,970,478 A | 10/1999 | Walker et al. | 705/35 |
| 6,092,047 A | 7/2000 | Hyman et al. | 705/4 |
| 6,154,732 A | 11/2000 | Tarbox | 705/36 |

(Continued)

OTHER PUBLICATIONS

"Insurdata: Insurdata Introduces New Interactive Employee Benefits Management Software Solution," Business Wire, Jun. 8, 1998.*

(Continued)

*Primary Examiner*—Jonathan Ouellette
(74) *Attorney, Agent, or Firm*—Osha • Liang LLP

(57) ABSTRACT

Human resource and employee benefit products for businesses, implemented on one or more computing devices connected to the Internet, are managed and administered. The combination of human resource and employee benefit products required by the businesses are determined, and are classified according to criteria including a number of employees, type of work performed, and similarity of needs of these businesses in the human resource and employee benefit management areas. A local set of the human resource and the employee benefit products is provided, as is a third party provider set of products located on the third party provider's computers. Both sets of products are then organized into integrated benefits packages, each of which packages may be modified by the customer by adding and subtracting products. The price of each integrated and modified benefits package is determined, which price will be binding on the third party provider for a defined period of time.

35 Claims, 19 Drawing Sheets

U.S. PATENT DOCUMENTS

| | | | |
|---|---|---|---|
| 6,332,125 B1 | 12/2001 | Callen et al. | 705/4 |
| 6,370,571 B1 | 4/2002 | Medin, Jr. | 709/218 |
| 6,389,457 B2 | 5/2002 | Lazaridis et al. | 709/207 |
| 6,401,049 B1 * | 6/2002 | Ehmer | 702/119 |
| 6,401,079 B1 | 6/2002 | Kahn et al. | 705/30 |
| 6,401,113 B2 | 6/2002 | Lazaridis et al. | 709/207 |
| 6,411,939 B1 * | 6/2002 | Parsons | 705/4 |
| 2001/0005857 A1 | 6/2001 | Lazaridis et al. | 709/219 |
| 2001/0005860 A1 | 6/2001 | Lazaridis et al. | 709/245 |
| 2001/0005861 A1 | 6/2001 | Mousseau et al. | 709/245 |
| 2001/0013071 A1 | 8/2001 | Lazaridis et al. | 709/246 |
| 2001/0032091 A1 | 10/2001 | Schultz et al. | 705/1 |
| 2001/0054115 A1 | 12/2001 | Ferguson et al. | 709/248 |
| 2002/0029177 A1 | 3/2002 | Smisek | 705/30 |
| 2002/0029258 A1 | 3/2002 | Mousseau et al. | 709/218 |
| 2002/0035506 A1 | 3/2002 | Loya | 705/14 |
| 2002/0042772 A1 | 4/2002 | Rudman et al. | 705/38 |
| 2002/0049617 A1 | 4/2002 | Lencki et al. | 705/4 |
| 2002/0049818 A1 | 4/2002 | Gilhuly et al. | 709/206 |
| 2002/0052764 A1 | 5/2002 | Banks | 705/4 |
| 2002/0069077 A1 * | 6/2002 | Brophy et al. | 705/1 |

OTHER PUBLICATIONS

"DCC Launches Beneworks to Deliver 'Event-Driven' Web-Based HR and Benefits Information," PR Newswire, Dec. 16, 1998.*

"Peoplesoft Delivers Human Resources Management 7.5 for U.S. Federal Government," Business Wire, p. 1222, Apr. 27, 1999.*

"New Benefits Enrollment System for Unigraphics Solutions Marks First 100% Internet Enrollment; SYLINQ/Insurdata Team Delivers the First Completely Paperless Enrollment Solution," Business Wire, Jun. 14, 1999.*

* cited by examiner

FIG. 4

The revolution in small business administrative services is finally here!

Give your business the level of administrative support that was previously reserved for the Fortune 100. Make eSourceOne your customized HR and Benefits Department today!

View a Demo  See how eSourceOne can relieve you of the burden of employee administration —76

Get a Quick Quote on a solution for your payroll admin, tax filing, 401(k), insurance and more!

Select a solution for you —

- Business start-up package
- Professional firm package
- "Easy Source" packages
- Customize your own

75

74

Partners
GUARDIAN
RELIASTAR
BlueCross BlueShield

TRUST-e

Free 401(k) administration!
Special offer for the next 48 callers  Find out more...

Attention Business Owners...

↑ Test your knowledge of employment regulations that apply to you!
What is the daily penalty assessed by the IRS for—
Are firms with less than 20 employees subject to...
Take our Free Compliance Audit ↑ Payroll has never been easier for you, or your employees   Find out how!

↑ As a small firm, can you really get Group Medical and Dental plans like the big players? Yes, see how!

78

77  eSourceOne Highlights

"Getting our firm up and running was easy—
—Ric, Managing Partner of New York Law Firm "eSourceOne answered all my questions and..."
—Jessica, Owner of New Jersey Engineering Firm More...

Lunch is on us!
Tell your boss you'll be back at 2:30 It's lunchtime...

FIG. 6

Your Work Life Center — Sippin Energy Products

Welcome Samantha Jones! Please activate your account. The deadline for benefits enrollment is October 11th. *Go to On-line Enrollment*

★ Don't forget the company fall picnic is Saturday, October 16th at Anderson Park from 11:00 AM – 3:00 PM.

★ Please welcome Samantha Jones to Sippin Energy. She is our new Sales Director for the High Tech sector.

*Your favorite eSourceOne links*
- View my paystub
- Expense Reports
- Guardian Physician Directory—NJ
- Check 401(k) Balances with Reliastar
- Member's Advantage of the Week

*Messages from eSourceOne...*
- Congratulations on your recent new arrival! eSourceOne now offers Child Care referral services – at 10% through 1/5/00
- Save up to 25% on your auto insurance as an eSourceOne customer!
- Win a new VW Bug! See how...

Sippin Energy Company Handbook

Sippin Energy Company Directory

Sippin Energy Company Calendar

Compensation & Benefits

Employee Assistance Plus

Search eSourceOne

TRUSTe

```
Employee Matters WorkCenter-Microsoft Internet Explorer                    _ □ ×
  File  Edit  View  Favorites  Tools  Help                                 Links
TRENDSETTER
       Manager WorkCenter                        ⊗  ⑦  ⊕  ⊙  ⊚
                                               Home  Help  Feedback  Service  Log Out
```

| | TRENDSETTER | | Period Beginning: | 06/10/2000 |
| --- | --- | --- | --- | --- |
| | 123 MAIN AVE | | Period Ending: | 06/23/2000 |
| employee matters | NEW YORK, NY 10818 | | Pay Date: | 06/23/2000 |

▼ Compensation
  My Paystub
  ■ Change Password
  ■ Change Question & Answer

HOMER SIMPSON
15 SPRING HILL ROAD
SPRINGFIELD, MA 05338
Employee ID: 005000
Social Security Number: 042-62-4857

| Earnings | Rate | Hours | Amount | YtD |
| --- | --- | --- | --- | --- |
| DENTAL EQUILIZATION PAYMENT | $212.69 | 0 | $212.69 | $838.07 |
| REGULAR SALARY | $1,600.00 | 80 | $1,600.00 | $20,800.00 |
| Gross Pay | | | $1,812.69 | $21,438.87 |

| Deductions | Taxes | Amount | YtD |
| --- | --- | --- | --- |
| | FEDERAL INCOME TAX WITHHELD | -$234.69 | -$3,183.88 |
| | NEW YORK STATE WITHHOLDING | -$89.21 | -$1,014.03 |
| | EMPLOYEE FICA WITHHELD | -$112.39 | -$1,329.16 |
| | EMPLOYEE MEDICARE W/HELD | -$26.28 | -$310.85 |
| | NEW YORK CITY TAX | -$0.00 | -$36.00 |
| | NY STATE DISABILITY W/H | -$1.20 | -$15.60 |
| Net Pay | | $1,348.92 | $15,548.57 |

| Payment Information | | | |
| --- | --- | --- | --- |
| Method of Payment | Account Number | Account Name | Amount |
| ACH | 0371250863 | CHASE | $1,198.97 |
| ACH | 0371250863 | CHASE | $1,348.92 |

| Time Tracking Information | | |
| --- | --- | --- |
| Time Tracking | | This Period | YtD |

FIG. 14

METHOD AND SYSTEM FOR REMOTELY MANAGING BUSINESS AND EMPLOYEE ADMINISTRATION FUNCTIONS

CROSS-REFERENCE TO RELATED APPLICATION

Priority is claimed to U.S. Provisional Application Ser. No. 60/174,480 filed Jan. 4, 2000 entitled "Method and System for Remotely Managing Business and Employee Administration Functions", which is referred to and incorporated herein in its entirety by this reference.

BACKGROUND OF THE INVENTION

1. Field of the Invention

This invention pertains to an integrated business process and system for remotely managing business and employee administration services. More particularly, this invention relates to a business process and system to allow remote outsourcing of human resource and other business and employee administration functions.

2. Description of the Related Art

Administering employee benefits is a time consuming, complicated and costly burden for most small and medium size companies. Smaller companies typically do not have the expertise or scale to effectively manage employee administration and human resource functions such as payroll, tax filing, health benefits, retirement plans, workers' compensation and other business insurance, or human resources compliance more generally. In fact, employee benefits administration diverts a significant amount of management time from the core strategic or revenue producing activities of the enterprise. In addition, there are compliance risks associated with being an employer that are significant for smaller companies that don't have the resources to understand their ever-changing and complex regulatory responsibilities.

In addition, smaller companies are usually unable to hire qualified personnel with the expertise to manage the human resource and employee administration activities for them effectively. Not only do employers and employees both become frustrated with the amount of time required to be spent on these lower-value activities, but employers are often not sufficiently well-informed regarding their responsibilities as employers that are imposed by an ever-increasing and complicated set of employment statutes and regulations. Companies that remain unwittingly out of compliance can be subject to serious retroactive sanctions.

Because these activities are essential, although rarely strategic, human resource and employee administration processes are ideal candidates for outsourcing to companies that make those activities their strategic work—that is, companies that can perform such services cheaper, better, and faster than their clients. Outsourcing non-strategic activities has been popular among larger companies for many years. Outsourcing is becoming increasingly popular among smaller businesses as the benefits of focusing on a company's competitive work become more clear and as outsourcing providers increasingly take aim at the smaller company market.

In a parallel development, the Internet has emerged as a mass communications and commerce medium enabling millions of people and businesses worldwide to share information and conduct business electronically. International Data Corporation of Framingham, Mass., USA as of 1999 has predicted that the number of Internet users will grow from 100 million in 1998 to 320 million in 2002. In addition to its emergence as a mass communications medium, the Internet has features and functions that are unavailable in traditional media. These features and functions include e-mail and immediate, 24-hour access to hundreds of thousands of companies from around the world. Along with the impressive overall growth of the Internet, business-to-business usage is also growing rapidly, as businesses are increasingly leveraging the Internet's ability to reach customers globally, deliver personalized content and services; and open new distribution channels. While consumer buying on the Internet will likely grow over 300% over the next three years, the business-to-business market is viewed by many as the area that will benefit the most from revolutionary improvements enabled by the Internet. Industry sources predict that, over the next few years, business-to-business transactions will likely account for nearly 90% of all Internet transactions.

The emergence of Internet technology enables the integration of multiple and complex elements in the employee administration activity flow. The Internet technology allows for instant deployment without any requirement to invest in technology other than a Web browser. Many of the traditional administrative service providers also have initiatives in various stages of development to provide Web-based information and access for their clients. The sector has also spawned Web-based outsourcers providing services ranging from employee benefits management to payroll management to travel management.

Given the attractiveness of outsourcing, particularly for non-core functions such as employee administration and human resources, various companies are already involved in the provision of administrative services, and some of these companies also provide such services via the Internet. These companies include (a) non-integrated services providers, such as payroll processing companies and third party administrators (TPAs) for various insurance or financial products, (b) professional employer organizations (PEOs), also known as employee leasing companies, that offer integrated employee administration and human resource services through a co-employment arrangement whereby the employees of client companies also become employees of the PEOs, (c) application service providers that host certain employee administration and human resource applications in a service bureau environment, and (d) human resource integrated system software providers.

Functions provided by non-integrated administrative service providers (both traditional and electronic) include payroll processing, insurance brokerage, workers' compensation claims administration, medical claims administration, and unemployment claims administration. A variety of more specialized and complicated human resources functions are also provided, such as Section 125 Plan Administration (a statutory provision in the U.S.A. tax code to permit payment of employee contributions for benefit plans to be taken from pre-tax finds), COBRA administration (a U.S.A. statutory provision for the temporary continuation of employer group health insurance for employees, when that insurance would otherwise end, enacted as part of the Consolidated Omnibus Budget Reconciliation Act of 1985), 401(k) retirement fund plan administration (a provision of the U.S.A. tax code), and human resource consulting. It should be appreciated that the administration of such plans can become quite complex for a large workforce, and for employers that provide a variety of related plans that are interrelated. While a collection of non-integrated service providers may offer more product choice, they do not possess the desired level of efficiency, accuracy, and functionality. Furthermore, for a typical employer in the target market, the onus of interacting with wide range of service providers, selecting among numerous product offerings, and maintaining these outsource relationships can actually increase the time and cost burden on the employer. While many of these administrative service providers (in particular the payroll companies) have attempted to expand their human resource service offerings for their clients to include other human resource and administrative services, the breadth and functionality of these recent initiatives fall well short of the desired model.

PEOs, by entering into co-employment arrangements with clients, aim to provide employee-administration services to a large number of employees, thereby deriving economies of scale as well as delivering services at a level typically available only to larger corporations. There are over 2 million employees currently under PEO arrangements. The industry is highly fragmented with approximately 2,000 companies, most of which serve a single market or region, leaving companies with offices and employees in different states in a bind. Because workers' compensation insurance arbitrage is a significant source of revenues for PEOs, PEOs have tended to largely target the blue-collar industry segments.

There are certain regulatory questions regarding the definition and responsibilities of the "employer" in a PEO relationship as well as certain detrimental side effects of the co-employment relationship. First, the PEO model requires that there be a shared employer status with the client. In addition, signing on with a PEO requires resetting an employee's wage base to zero for the purposes of calculating federal and state payroll, social security and Medicare taxes. PEOs also generally suffer from adverse selection in group medical care due to a lack of minimum participation requirements during client acquisition process. Moreover, should a company decide to withdraw from a PEO relationship, it may lose its independent workers' compensation modifier and its unemployment rating which could negatively impact that client's insurance and payroll tax costs. Furthermore, in a PEO relationship, small companies subject themselves to larger employer legislation, such as the Family Medical Leave Act of the U.S.A.

From a revenue perspective, PEOs are not permitted by legislation to earn commissions or other income from the sale of third party products and services (e.g. insurance and financial products) to their co-employees. Finally, as a competitive service offering, the PEO industry is small and immature, with most companies struggling with limited technical infrastructure and a manually intensive service delivery model. The industry has also been plagued by well-publicized failures of financially unsound and, in some cases, unscrupulous operations.

As with the non-integrated administrative service providers, certain participants in the PEO industry are in various stages of developing a Web presence. For example, the company called Administaff, Inc. of Kingwood, Tex., USA has an operational Web site at the uniform resource locator (URL) address of www.administaff.com to serve its clients.

Application service providers (ASPs) manage all the hardware, networking equipment, and software for certain employee administration and human resource applications, and allow their customers to access the applications through a Web interface or over a dedicated communications line. One such firm is known as USinternetworking, Inc. (USI), of Annapolis, Md., USA, having a URL Web site at www.usi.net, which delivers via the Internet on a service-bureau basis enterprise applications covering relationship management, electronic commerce, data warehousing, Web site management, human resources and financial management. A Web-enabled engine from Peoplesoft, Inc. of Pleasanton, Calif., USA powers USI's financial management, human resources, benefits administration, and payroll product offerings. Another example is Employease Inc. of Atlanta, Ga., USA, a company that provides human resources (HR) information management over the Internet, and which has a Web site at the URL of www.eease.com, through which it provides an extranet-style service that allows human resource client personnel and the client's vendors, partners and trusted advisors to access employee data on a consistent and controlled platform. Providers such as these would typically target and attract significantly large clients.

Human resource integrated system software providers such as Peoplesoft, Inc.; SAP AG of Walldorf, Germany; Lawson Software of St. Paul, Minn., USA; and Best Software, Inc. of Reston, Va., USA; which offer human resource integrated system packages designed to help manage the payroll and administration functions within companies. There are also user interface systems such as the "iClick" service from Product Technologies Corporation of White Plains, N.Y., USA, which is designed to increase the self-service functionality of human resource integrated systems. These software products are generally designed to operate in larger company environments under control of human resource professionals.

Because many of these service companies outsource their individual services to outside providers, the quotations that are provided to potential clients are necessarily fractured into the various service portions. Further complicating the quotation calculus is the fact that the costs for these services may vary from jurisdiction to jurisdiction. None of these systems has the ability to provide an instantaneous quotation for a whole package of employee benefit services, as specifically identified by the client and in the client's specific jurisdiction.

Accordingly, it would be advantageous to provide a fully integrated employee administration system and human resource outsourcing service that can be accessed via the Internet by either the employer or the employee.

It also would be advantageous to provide a fully integrated employee administration system and human resource outsourcing service that does not require shared employer status with the client company.

It would be further advantageous to provide an Internet-based employee administration system and human resource outsourcing service that can react to information provided by the employee by suggesting actions to be taken and that can carry the subscriber through these actions at a time convenient to the subscriber.

SUMMARY OF THE INVENTION

These and other advantages of the invention are accomplished by providing an integrated system and business process for employee administration and human outsourcing to which both companies and their employees can subscribe. The system is able to perform several types of administrative and human resource services, such as: payroll/administrative services, including payroll and tax filing, unemployment claims, COBRA and pre-tax plan administration; insurance services, including group health, property and casualty, and personal lines; retirement and savings plan administration, including 401K and IRA retirement savings plans, and deferred compensation plans; human resource services, including compliance material, employee development tools and advisory services; business network services, including discount procurement, purchasing cards, work share and e-mail; and employee services, including credit card and discount legal services.

The system is accessed by an Internet connection and a Web browser, without a need for a traditional stand-alone application and software. The system maintains the business subscriber data on database servers. The applications components that make up the technical platform include (1) a user interface, (2) integrated human resource and supporting payroll administration integration, (3) customer service and contact management, (4) accounting, and (5) billing. The system is contemplated with three tiers: a client presentation tier that accepts business subscriber input; a business logic tier that accepts input from the business subscribers and processes it according to defined business rules, such as by extracting data as needed, and a data services tier that controls data access and storage. These tiers are primarily software driven and are not necessarily dependent upon the particular hardware components used.

In operation, the system first surveys a wide base of firms of similar type and size and with similar needs and determines what benefits/choices such firms (set of clients) might require. The system then approaches various providers of such services and asks what benefit packages these providers may offer, given fixed requirements of a specific set of clients. In one particular embodiment, options for business subscribers or clients, are then grouped into fully integrated employee benefit packages and priced according to content. In another embodiment, a specific set of clients may be offered a fixed choice of benefit packages that cannot be modified or customized further. In the preferred embodiment, customers will be able to create a customized package by selecting from offered choices of benefits.

The prospective business subscriber may access the inventive system on the Internet Web site using a standard Web browser. The inventive employee administration and human outsourcing system presents screens and forms to a business subscriber for input of data. The business subscriber enters information as requested, and the system accepts the data using appropriate encryption security measures. Certain defined business translation rules allow the business subscriber data to be processed and translated into the form comprehensible by internal as well as the third party provided benefits package components. The data is stored and processed according to these rules so as to perform the desired administrative functions.

The system of this invention has the ability to provide a price quotation for the entire group of services that are offered to a client within a set of benefit packages. This price quotation is provided regardless of the origin of the individual services within the benefit packages. The price quotation feature may operate by having each service provider, whose services are offered, supply to the inventive system a formula and/or a list of factors on which the quotation calculation is based, for determining a price for the services offered.

When business subscribers access the system, they are asked to submit information regarding their business and its structure. Based upon this submitted information, several benefit packages of services that the system determines as best satisfying the potential client's needs and requirements are presented to such potential client to choose from. The system further allows the potential client to add or delete services from the selected package, and then calculates the price quotation for the service offered for each service provider and aggregates all quotations into a single pricing quotation for each benefit package of services.

Another aspect of the invention relates to a method of management of the benefit package grouping selected by the client. The management system includes seamless integration of benefit packages from various providers, where the integration occurs at least partially by sharing, among the various benefit packages, the relevant personal employee information that has been provided to the management system. The system's Web site will appear specific to whoever logs on, i.e., the subscriber/employer or the employee, based on information originally provided during set up and information provided during all subsequent sessions, within the parameters of the options chosen by the subscriber/employer. The integrating layer will, interactively and by anticipating certain events, provide advice and guidance to each subscriber or each employee based upon the total information provided at various times and will also be able to act on the information or life events to initiate appropriate actions in affected benefit packages. The system will be predictive, in accordance with the information provided, to suggest actions that need to be taken and actively guide the user through those actions.

BRIEF DESCRIPTION OF THE DRAWINGS

The above and other objects and advantages of the invention will be apparent upon consideration of the following detailed description, taken in conjunction with the accompanying drawings, in which the reference characters refer to like parts throughout and in which:

FIG. 4 is a promotional interface screen for presenting the system of the present invention to prospective customers.

FIG. 6 is an interface screen for existing customer's employees' interaction with their selections from the subset of the HR processes managed by the system of the present invention.

FIG. 13 is an Employee Event Management function display page of the graphical user interface provided by the system illustrated in FIG. 8.

FIG. 14 is an Employee Work Center display page of the graphical user interface provided by the system illustrated in FIG. 8.

DETAILED DESCRIPTION

This invention comprises an integrated system and business process for human resource administration and employee management. This system enables companies to increase their profitability by reducing time and resources spent on non-revenue producing activities, assisting clients in attracting and retaining high quality employees, and reducing the cost and risk of human resources and employee administration.

Architecture

Figure 1:
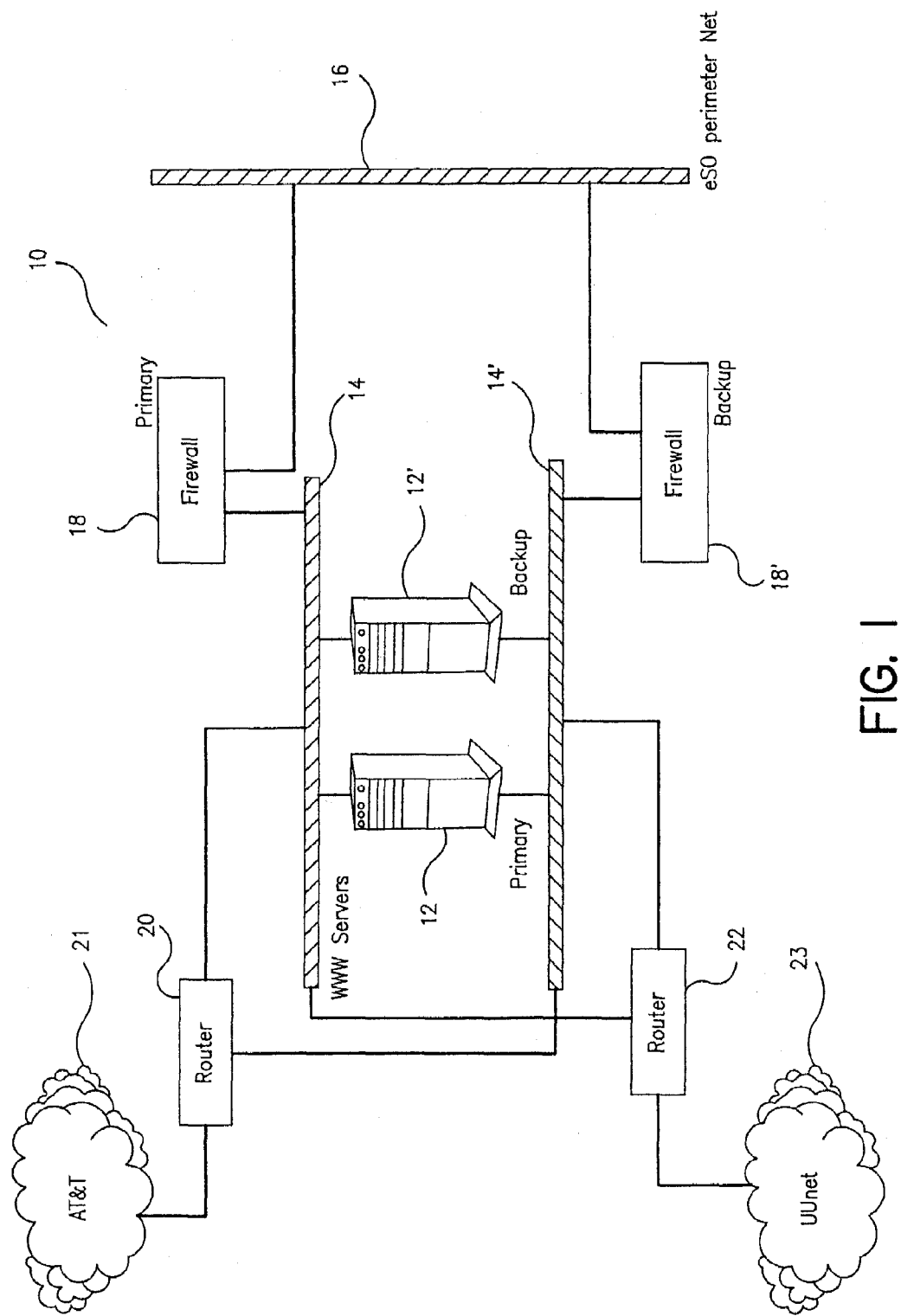
FIG. 1 is a hardware interconnection of the system of the present invention.

FIG. 1 shows a typical architectural implementation of a system 10 of the present invention, including a computing device 12, its identical backup computing device 12'. Both computing devices 12, 12' are connected to a duplex backbone network 14, 14'. Access to computing devices 12, 12', may be achieved through a connecting perimeter network 16, for example the Internet. Those skilled in the art will recognize that the Internet thereby provides a means of access to the computing devices 12, 12'. To provide secure access only to authorized users, the perimeter network 16 is connected to the backbone network 14 through a primary firewall 18 and to the backbone network 14' through a backup firewall 18'. Access to the computing devices 12, 12' may also be achieved through a router 20 that connects the duplex backbone networks 14, 14' to the telephone network 21, and through the router 22 connecting the duplex backbone networks 14, 14' to a network 23. A plurality of installations of system 10 may be connected to the perimeter network 16 to achieve various goals of the invention.

Figure 2:
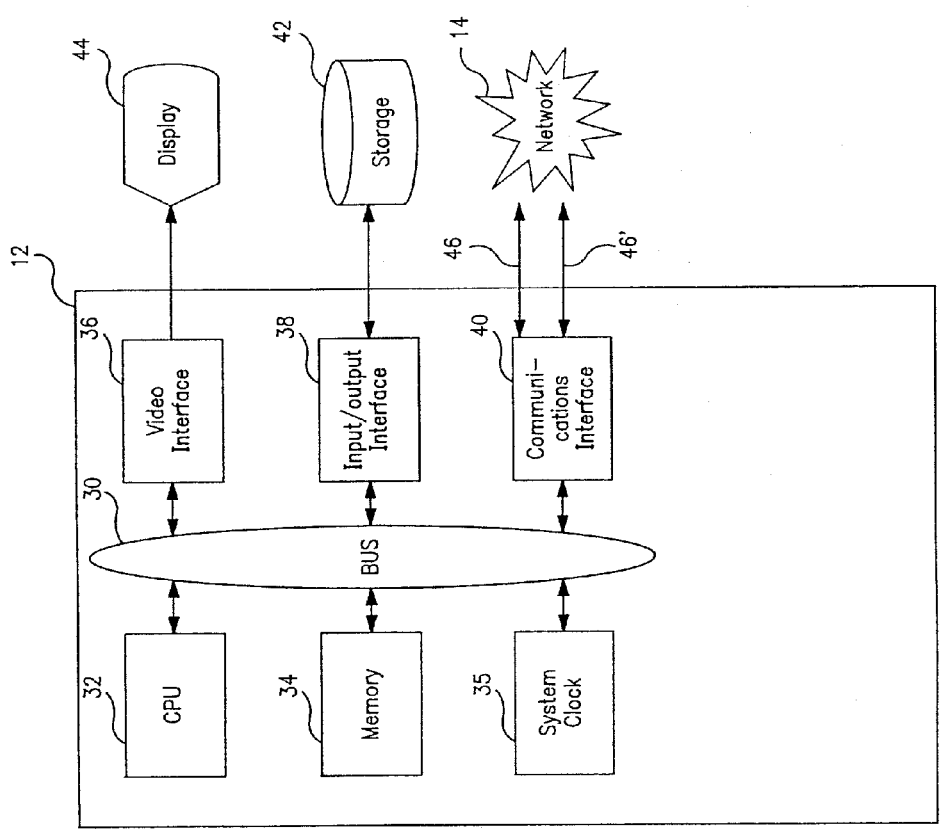
FIG. 2 is a hardware configuration of the computing device of the present invention.

The basic configuration of each of the computing devices 12, 12' is depicted in FIG. 2. In one illustrative embodiment, the computing device 12 may include a bus 30, which is connected directly to each of a central processing unit (CPU) 32, a memory 34, a system clock 35, a video interface 36, an input/output (I/O) interface 38, and a communications interface 40. The common bus 30 is connected by the I/O interface 38 to a storage device 42, which may illustratively take the form of memory gate arrays, disks, diskettes, compact discs (CD), digital video discs (DVD), etc. The video interface 36 couples a display 44 to the common bus 30. The communications interface 40 is coupled to network ports 46, 46', which in turn are connected to the network 14, 14', whereby a data path is provided between user's computing devices via the network 16 (FIG. 1) and the backbone 14, 14' and the computing devices 12, 12'.

Figure 3:
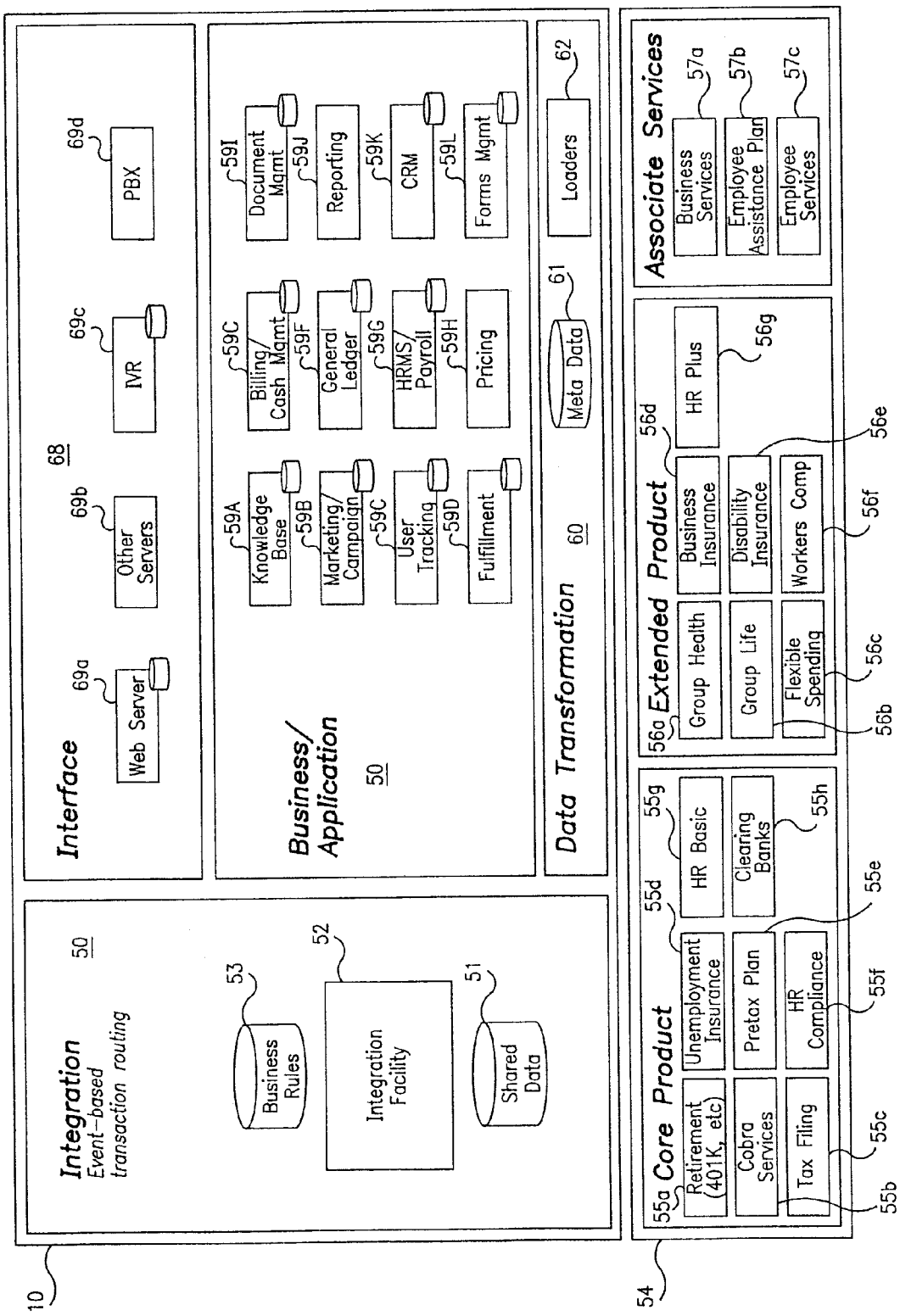
FIG. 3 is a functional process diagram of the system of the present invention.

As shown in FIG. 3, the architecture of the system 10 of the present invention in its preferred embodiment, may comprise a user interface tier 68 for accepting user input in to the system 10. The user interface may be accessed via a Web-server component 69a by means of the Internet 16 (FIG. 1), the PBX component 69d by means of the telephone network 21 (FIG. 1), the Interactive Voice Response (IVR) component 69c, also by means of the network 23 (FIG. 1), and via any other known means 69b.

After the system 10 is accessed via any component 69a, 69b, 69c, 69d of the interface tier 68, any user request or inquiry is passed to an integration tier 50, comprising an integration facility 52 for performing requested user actions, a shared data database 51 for maintaining basic user information common to participating systems of a business application tier 58 and of a third party products tier 54, and a business rules database 53 comprising common rules followed by all participating systems of the business application tier 58 and of the third party products tier 54.

The service integration tier 50 accommodates user requests by accessing targeted business application tier 58 products 59, and third party provider tier 54 products 55-57 residing on host computing devices belonging to the individual third party providers outside of the system 10, to perform seamlessly as one unit. This is achieved with the use of the data transformation tier 60 that includes a meta-data database 61 comprising data formats and loaders 62 of all participating systems of a business application tier 58 and of a third party products tier 54. The integration facility 52 uses the data transformation tier 60 to present the data retrieved from the business application products 59 and the third party provider products 55-57 to the user via the interface tier 68. This enables the inventive system 10 to offer to its customers, a particular range of suitable product located within and outside of the system 10 as unified benefit package combinations.

Packaging Benefits

As presently contemplated, the products 59 and 55-57 relate primarily to human resources (HR) business functions, and may include at least the following administrative services:

(a) payroll/administrative services 59g, which would include Human Resources Management System (HRMS) functions such as payroll and tax filing, unemployment claims, COBRA, and pre-tax plan administration;

(b) insurance services, which includes group health, property and casualty, and personal lines insurance, retirement and savings plan administration, including 401k, IRA, and deferred compensation plans;

(c) human resource services, including compliance material, (d) employee development tools and advisory services; business network services, including discount procurement, purchasing cards, work share, and e-mail; and (e) employee services, which could include credit card and discount legal services, among others.

These products 59 and 55-57 are selected for inclusion in the business application 58 and the third party 54 tiers in the following manner:

(1) First, a wide selection of similar-type businesses is surveyed. These surveyed businesses, representing potential customers with similar numbers of employees, may engage in similar types of business, and have similar needs as far as the human resource management areas are concerned. One example of the type businesses surveyed may include computer consulting companies located in various states, each company employing a certain number of employees, e.g., fewer than 50. These surveys determine what choices of benefits or services such companies, which represent potential customers, might require.

(2) The target companies may then be grouped based on various criteria such as the type of business, the number of employees, type of work performed, e.g., service or manufacturing, or some other criteria.

(3) Business application products required, as determined in step (1), to accommodate the needs of the target clientele, e.g., General Ledger 59f and payroll 59g, are then procured and installed in the business application tier 58 of the system 10.

(4) A number of diverse providers of services, required as determined in step (1), to accommodate the needs of the target clientele, e.g., Fidelity® for 401K or retirement investment 55*a*, are then approached with the survey results and requested to offer certain competitive benefit packages to the targeted prospective clients. These third party provider service and benefit packages comply with the requirements of the precise set of clients ascertained by the surveys described above.

All of the third party provider products 55-57 may be managed on the computer devices, such as those described with reference to FIG. 2, in an on-line environment, i.e., connected to the network 21 (FIG. 3), to which the integration facility 52 may have access. As presently contemplated, the third party service provider products 54 may include at least the following services:

(a) Retirement plans, including 401(k) 55*a*;

(b) Unemployment 55*d* and Worker's compensation 56*f* insurance;

(c) Group Health and dental insurance 56*a*;

(d) Group life 56*b* and disability 56*e* insurance; and (e) Employee assistance 51*b*, tax filing 55*c*, and child care services.

Package Pricing

The integration facility 52 may separate the products 59 and 55-57 into critical and non-critical products. The system 10 creates a variety of alternative integrated benefit packages of services selected from among the critical and non-critical third party tier 54 products 55-57 and the business application tier 58 products 59. These benefit packages are priced and offered for sale to clients. It should be noted that each third party service provider may have a different way of calculating the pricing structure for a specific service. Such calculation may be based upon such service provider's specific application of certain predetermined factors.

For example, one health plan may be offered with a certain price quotation based upon that plan provider's own particular calculation derived using certain predefined factors, whereas a different health plan provider may give a different price quotation for services offered, based upon different calculations derived using certain other predefined factors. This may occur even though the services offered are identical. The certain predetermined factors may include state regulations, plan provider's assessment of the client profiles, and promotional services offered. Moreover, many providers that offer one or more services to clients are able to provide accurate quotations to the clients only for individual services offered but not for a whole package of services and benefits provided by the aggregate of different service providers.

The illustrated system has the ability to provide a quotation for the entire panoply of services included in the benefits package. The pricing of benefit packages may be performed in a number of ways, e.g., an arbitrary fixed price may be pre-assigned to each benefits package. In another embodiment, each service provider may provide, to the system 10, a list of factors used to establish a price quotation for the offered service and also provides the exact relationship between those factors on which the quotation calculation is based. The jurisdiction within which the client resides is among these factors. That is because each location and jurisdiction has laws and requirements, different from those in other jurisdictions, with respect to many of the offered insurance and other services.

In the preferred embodiment of the present invention, each third party provider may contribute or grant a cost calculating algorithm or a table relationship from which the cost of the offering may be derived. The customer is allowed to select a fixed benefits package by selecting all presented components or by picking and choosing a subset of these components. An affiliated algorithm is executed or a table relationship is used to derive the total cost of the selected components of the benefits package. This final price may be presented to the customer as a bid binding all providers for a set period of time.

The customer may choose from among the varied benefit packages offered using criteria, such as cost, flexibility, range of services offered, etc. In one embodiment, for example, the system 10 may offer the clients a specific set of varying packages, each comprising fixed benefits. Clients may then be free to select one most suitable benefits package from that fixed set. The client may not then mix and match from among the services offered. If the client desires to change the purchased benefits package to add or remove a feature, in the embodiment being described, the client may downgrade or up-grade the whole package.

In another embodiment, the customer may be given the ability to construct custom benefit packages from components offered in the business application products 58 and offered in the third party service provider products 54. In this embodiment, the customer may choose from among providers, as well as among certain benefits and services offered.

Interface

After the benefit packages are purchased, the services comprised within all the benefit package components are maintained and managed by the system 10. The customer interface tier 68 allows potential and existing clients to access the system 10. This access may be achieved through a network 23 (FIG. 1), for example the Internet. Access by each potential client may be managed by the integration facility 52, which will be later described in detail with reference to FIG. 7. Any prospective client connecting to system 10 through the user interface tier 68 may be presented with a number of screens requesting information regarding the client's business and the structure of such business. This information is collected by the integration facility in the shared data database 51, and used to determine the needs of the prospective client and to offer appropriate subset of products 59, 55-57 organized into benefit packages to serve these needs.

As shown in FIG. 4, benefit packages 74, best satisfying the needs and requirements of the potential client, may be presented for purchase by the integration facility 52 (FIG. 3) via the interface 68 (FIG. 3) on the prospective client's device. Additional products 59, 55-57 (FIG. 3) may also be added to and stripped from the benefit package selected for purchase by the prospective client. After selecting the benefits package, a price quote 75 may be requested by the prospective client and presented by the integration facility 52 (FIG. 3). Moreover, promotional 76 and informational data 77, may be provided by the integration facility 52 (FIG. 3).

Returning to FIG. 3, another feature of the invention relates to the management of the benefits package selected by the client. The integration facility 52, which will be described in detail with reference to FIG. 7 below, collects and shares the pertinent information about the user/employee, e.g., social security number, name, address, birth date, marital status, children's names, etc. This information is provided by each user/employee to the system 10 via the integration facility 52 during the initial setup, when the benefits package is purchased. This pertinent information is stored in the database 51. The integration facility 52 will release only the data specific to whatever customer logs on, i.e., the user/employer or the employee, based on information originally provided by both the user/employer and the employee during set-up and based on information provided during all subsequent sessions, within the parameters of the options chosen by the user/employer.

Life Events

Figure 5:
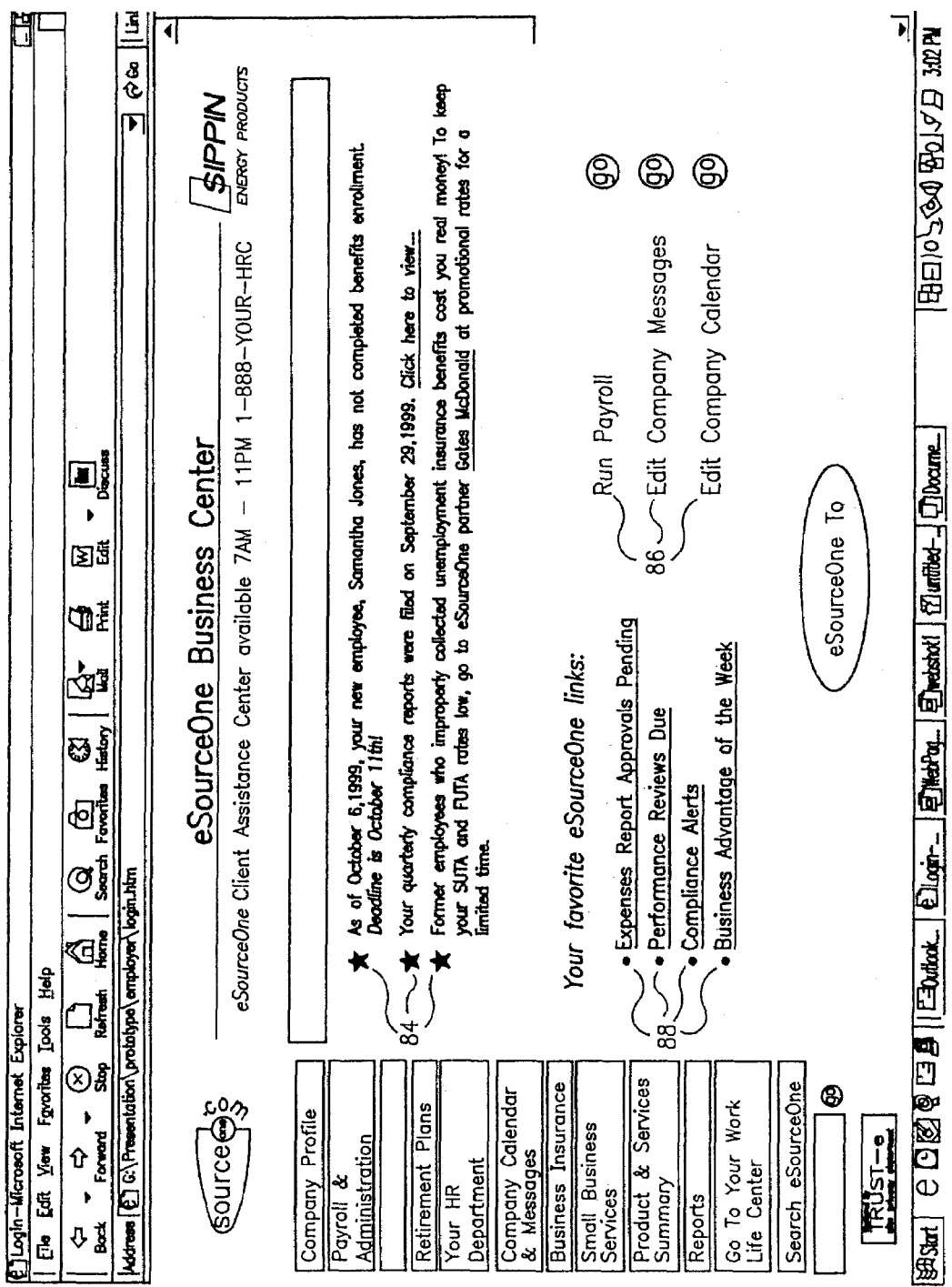
FIG. 5 is an interface screen for existing customer's interaction with the subset of the HR processes managed by the system of the present invention.

The interaction between the user and the system 10 may be achieved through the use of any commonly used Web browser if the interchange is proceeding over the Internet, where an interface screen is presented to the user who is the company owner/employer or manager. As shown in FIG. 5, the integration facility 52 (FIG. 3), interactively and by anticipating certain life events, provides advice and guidance information 84 to each subscriber. Furthermore, reminders of necessary business tasks 88 are presented, again triggered by any number of life events. An example of a life event may be the passing of December 31, which event indicates the end of the personal tax calendar year, triggering the need to issue tax statements in time for the January 31 cutoff date and in time for the tax return filing day of April 15 in the U.S.A.

Returning back to FIG. 3, the life events may also comprise the following triggering data: information about the client's business, employees, suppliers, governmental regulations, client's financial standing, childbirth, hirings, firings, policy changes, and other such events. The life event triggering data may be provided by the client on a continuous basis. When a life event triggers action, the integration facility 52 initiates appropriate actions in each of the products 59, 55-57 of the subscribed-to benefits package, possibly alerting the user/employee to any outstanding HR functions that need to be performed.

Aside from tasks being performed automatically through the life events, the user/employee may request that a specific task 86 (FIG. 5) be performed or allowed to be performed manually. Such tasks 86 (FIG. 5) may include running of the payroll, editing company messages displayed by the interface 68, and editing the company's calendar.

For example, if an employee is terminated, the employer provides this updated information to the integration facility 52. The system 10 will initiate the following events, among others: the payroll process 62 will stop compensatory payments as well as unemployment and tax deductions for the benefit packages 54; the health insurance benefit will terminate and an appropriate COBRA coverage will be issued; and investment programs (retirement, 401K, profit sharing) will issue change requests, and so on. At each step, the employer or employee will be asked to enter certain information to effect these changes and to ensure that these changes are made smoothly. The system will prompt the employer to enter certain information and suggest additional actions that might be desired, such as establishing outplacement services, arranging for deletion of the employee from certain company benefits or promotions, etc.

In another example, if the employee notifies the system that he/she has had a new baby, by providing this information to the integration facility 52, the system 10 will prompt the employee to consider changes to the insurance coverage, withholding of taxes, and changes to investment, retirement, 401K, profit sharing plans provided by the benefits package purchased by the employer. The system 10 may actually guide the employee through these changes and effect them as requested. As time passes, the system will be able to prompt the employee to consider additional options or actions based upon the changing nature of his/her situation.

However, should either an employee or an employer decide not to pursue any of the actions suggested by the system 10 at the present time, these suggested actions may be deferred to a later, more convenient time. Suggestions may be placed in an "In Box" for later action. Should there be certain deadlines associated with a particular action item, the system 10 will flash a reminder at appropriate time intervals that the action must be taken soon. Further, should a deadline to take certain action be imminent, the system 10 might prevent any further processing unless the suggested action is performed.

Where an interface screen is presented to the user who is the employee, as shown in FIG. 6, the integration facility 52 (FIG. 3), interactively and by anticipating certain life events, provides individualized advice and guidance information 94 to each employee of the subscribing client. The provided advice and guidance 94 is based upon the total information about the employer and the employee maintained in the shared data database 52. Furthermore, a menu of available tasks 96 that may be taken by the employee is presented or suggest.

Regulations

The system 10 (FIG. 3) will make an online company handbook 95 available to the employees. Where the company employs workers in more than one state, the online company handbook 95 is individualized and the employee who is a resident of state "A" is shown laws and regulations pertaining to state "A" and the employee who is a resident of state "B" is shown laws and regulations pertaining to state "B". Additionally, some third party benefit providers do not service all states. Therefore, substitute products 55-57 (FIG. 3) will be supplied in such cases.

A customer assistance hotline will also be provided to help employees with their questions. Where the employee question concerns a third party product 55-57 (FIG. 3) the call may be switched to the customer assistance hotline of that provider, or the employee may be given the number to call.

The Integration Facility

The integration facility 52 (FIG. 3) receives all inquiries 96 coming from the employees, life events generated by events in customers' lives or reached according to the calendar, e.g., a holiday taking place on a pay day, whereby paychecks must be issued one day earlier. The integration facility 52 (FIG. 3) initiates a security lookup to determine whether the particular customer is entitled to a particular requested or life event-initiated action. If the determination is positive, the integration facility 52 (FIG. 3) originates action requests to the rest of the system 10 and to the third party products 54, if appropriate. Such action requests are based on customer provided information.

Figure 7A:
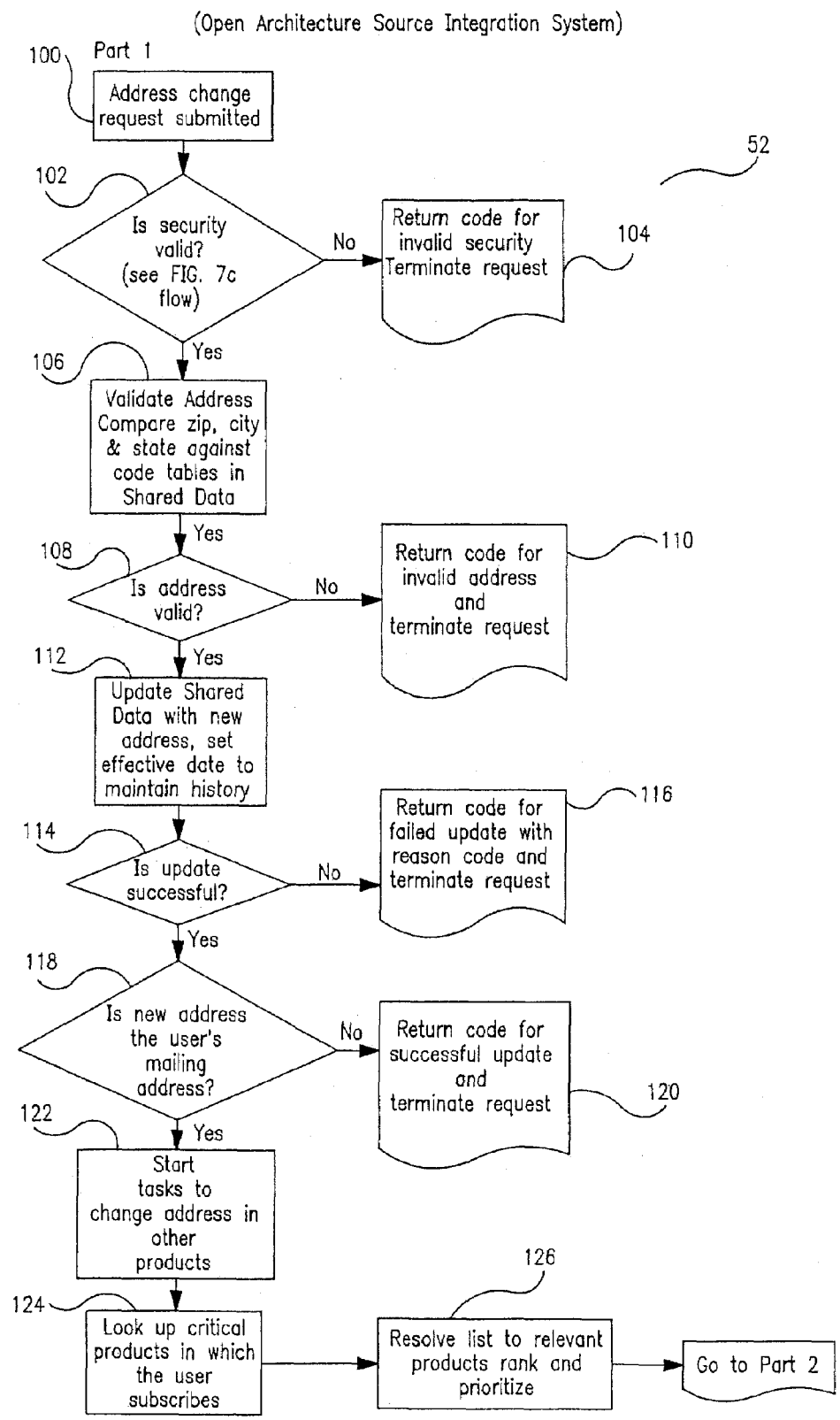
FIGS. 7a-c is a flow diagram of the integration facility of the present invention.
Figure 7B:
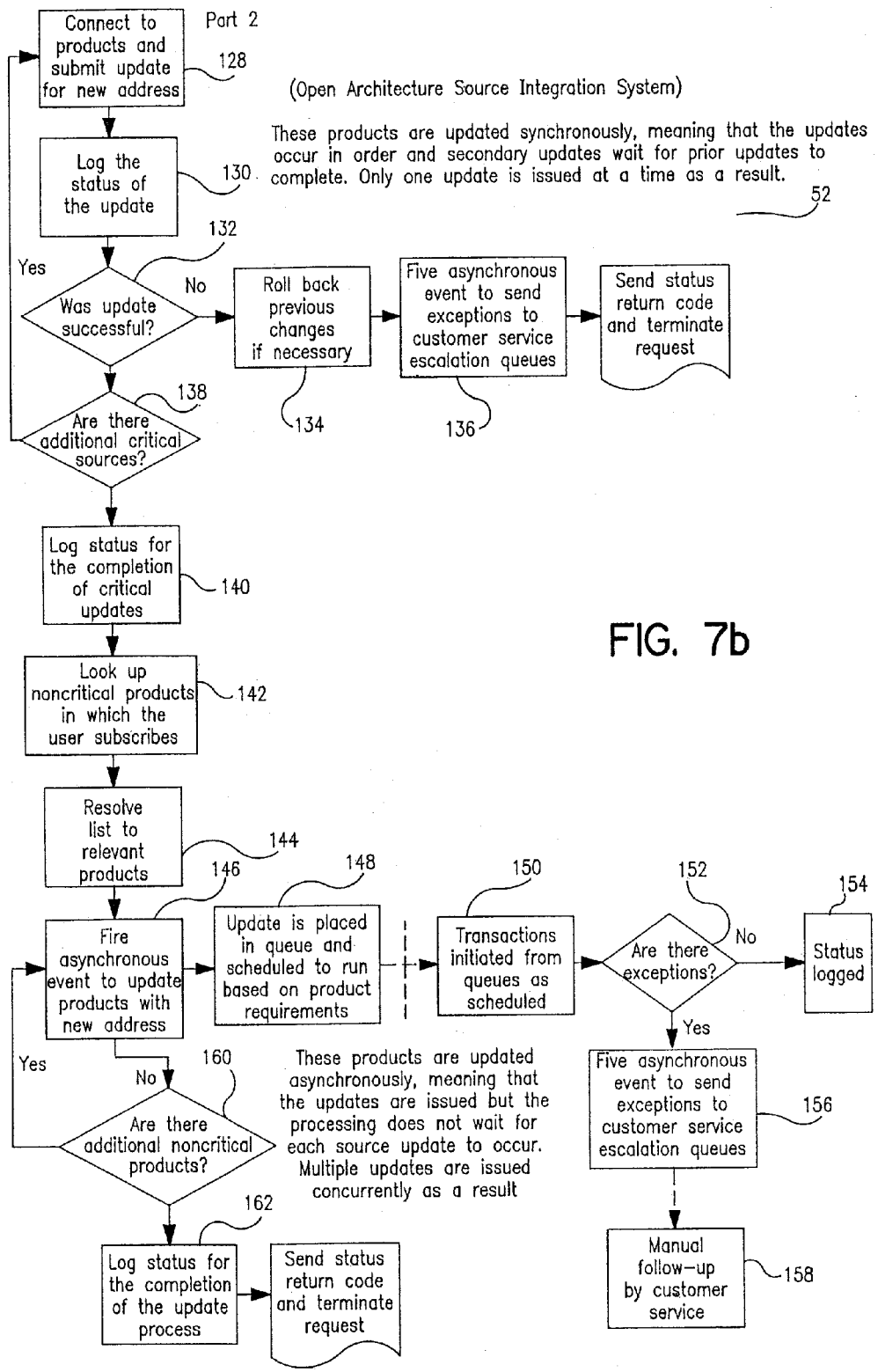
Figure 7C:
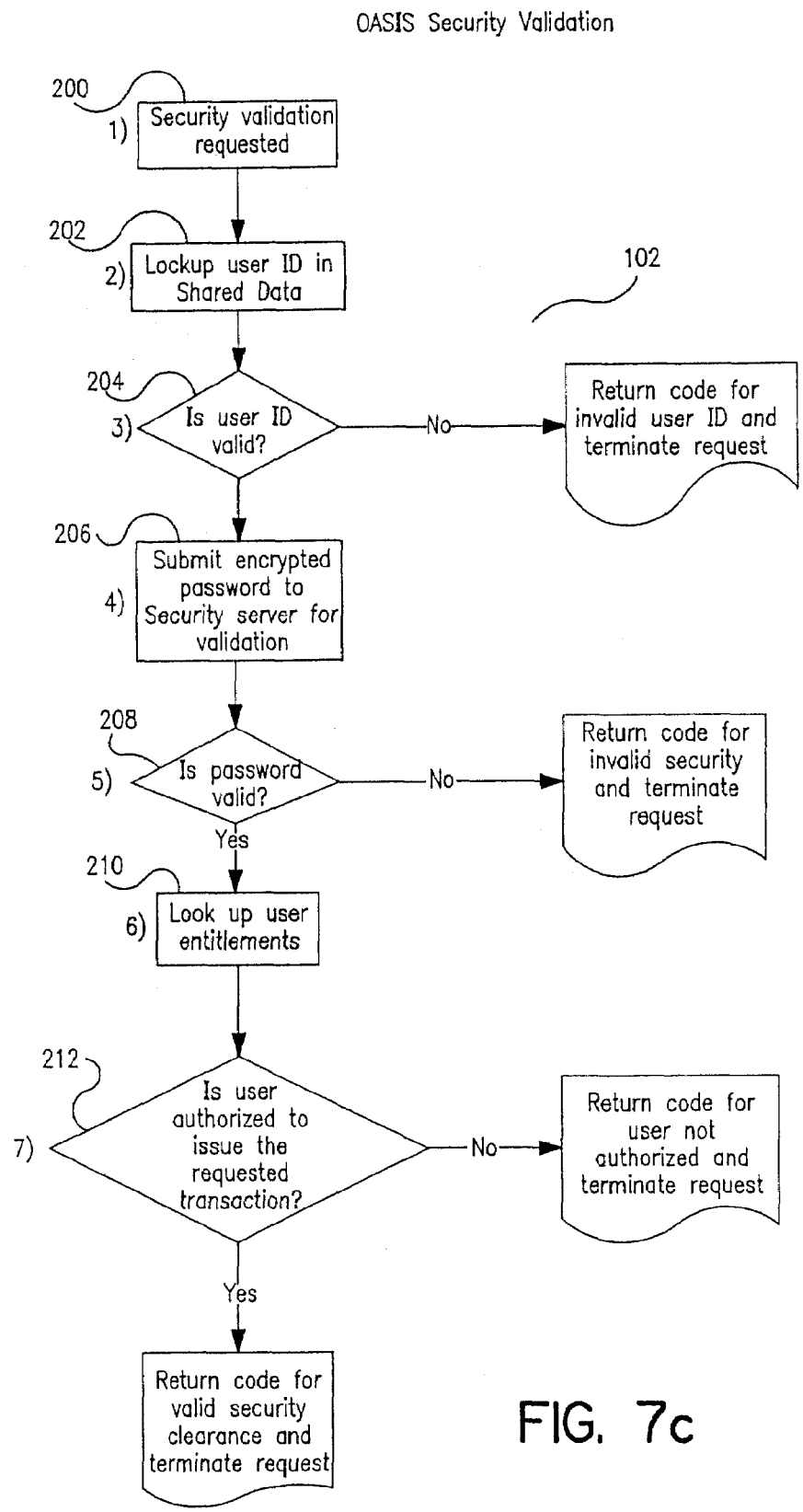

FIG. 7 (comprising FIG. 7a, FIG. 7b, and FIG. 7c) shows an exemplary flow of one embodiment of the integration facility 52 (FIG. 3), which is also known as the Open Architecture Source Integration System (OASIS). OASIS is comprised of component-based, event-driven technology that supports Distributed Component Object Model (DCOM), Java, and Common Object Request Broker Architecture (CORBA) to communicate with other system 10 components. The integration facility 52 (FIG. 3) comprises critical products including the HRMS/payroll 59g (FIG. 3) and the General Ledger 59f (FIG. 3), as well as non-critical products including some third party products 55-57 (FIG. 3). OASIS may be implemented utilizing event-driven action-reaction model technology to make development easier. OASIS components include:

(1) Event-triggering engine, comprising the following:

event profiles;

subscriptions for processes to register for notification of specific events;

events and event conditions;

actions and action conditions—the actions process is triggered as a result of an event;

rules—business and validation rules;

monitoring to determine when to trigger events based on data changes; and data storage adapters for translating data between sources.

(2) Business Action Objects.

(3) Information Source Adapter—Translation rules and data.

(4) Data Management Tool.

The integration facility 52 will now be described with reference to FIG. 7. As an example, please consider the situation where the customer submits a change of address request, which is performed in step 100. In step 102 the customer's privilege to perform such a transaction is verified. This verification is shown in FIG. 7c. The security or authorization validation is first requested in step 200. In step 202, the integration facility 52 (FIG. 3) looks up the customer's user ID in the shared database 51 (FIG. 3). If in step 204 it is determined that the user ID is invalid, the negative validation is returned to step 102 (FIG. 7a). In step 206 encrypted password is submitted to a security server part of the integration server 50 (FIG. 3) for validation. If in step 208 it is determined that the password is invalid, the negative validation is returned to step 102 (FIG. 7a). Otherwise, in step 212 a decision is made to determine whether the customer is authorized to issue the requested transaction. Depending on that determination a negative or a positive validation is returned to step 102 (FIG. 7a).

Returning to FIG. 7a; if access is denied, in step 104 the request is terminated and the customer is notified of the request termination. Otherwise, in step 106 the submitted information is validated, and in step 108 a determination is made if such information is valid. Here, again if the information is invalid, the request is terminated and the customer is notified of the request termination.

If the information was determined to be valid, shared customer data 51 (FIG. 3) is updated with the new information in step 112, after which if in step 114 a determination is made that the data update was unsuccessful the request is terminated and the customer is notified of the request failure and termination. In step 118 the data is evaluated as to its effect on the customer's profile and to which parts of the system 10 (FIG. 3) and third party products servers 54 (FIG. 3) need to be updated. For example if the address change was that of a mailing address, then all products 59, 55-57 (FIG. 3), which require such information need to be updated. If it is determined that additional products 59, 55-57 (FIG. 3) do not need to be updated, then in step 120 the customer is notified of the successful completion of his/her request, and the present transaction is completed.

If however additional products 59, 55-57 (FIG. 3) do require the informational update, then in step 122 the transactional tasks corresponding to each such product 59, 55-57 (FIG. 3) are initiated. In step 124 a verification is made to determine if the customer subscribes to all of the products 59, 55-57 (FIG. 3), for which tasks were initiated in step 122. These tasks are divided into two lists, one for critical products and the second for non-critical. Critical and non-critical products were discussed above in the Package Pricing section of this application. In step 126 the critical tasks are prioritized.

FIG. 7b shows continuation of the flow of the integration facility 52. Steps 128-138 are performed for each critical task initialized in step 122, filtered in step 124, and prioritized in step 126. These tasks are executed synchronously, i.e., the updates occur in order of priority, one execution at a time with the subsequent task waiting for the previous task to complete. Thereby only one task is issued at a time. In step 128 the task is executed and the update is applied to the product, for example the disability insurance 56e (FIG. 3). To achieve this the integration facility 52 applies translation rules from the translation or business rules database 53 (FIG. 3) so it can convert the address to a form acceptable to the target product.

For example, if the employee name information is stored in the shared data database 51 in the first name first, last name last format, and the user tracking product 59c requires the last name first, first name last format, the integration facility will accommodate such change.

In step 130 the status of the transaction is logged and in step 132 a determination of a success of the transaction is made. If unsuccessful, in step 134 a roll back of previous tasks initiated in step 122 commences and is performed asynchronously, i.e., not in any particular order, in step 136, after which the transaction is terminated. In step 138, the synchronous processing of tasks initiated in step 122 continues by returning to step 128 if there are more tasks to process or by logging the completion status in step 140 if there are no more tasks.

In step 142 a verification is made to determine if the customer subscribes to all of the non-critical products for which tasks were initiated in step 122. In step 144 these tasks are prioritized, and in step 146 asynchronous tasks to perform the customer-requested transaction are issued. Each task is performed by placing, in step 148, an update request in a queue and scheduling execution according to the requirements of the non-critical products. In step 150, queued transactions are executed at scheduled times. If in step 152 no exceptions were detected, in step 154 the status of the executed transaction is logged. Otherwise, if there were exceptions, asynchronous tasks are initialized in step 156 to notify customer service to perform in step 158 manual follow up.

In step 160, a determination is made if there are any more non-critical services to transact with. If there are the processing returns to step 160, otherwise in step 162 the status is logged and the process is terminated.

Network Architecture

Figure 8:
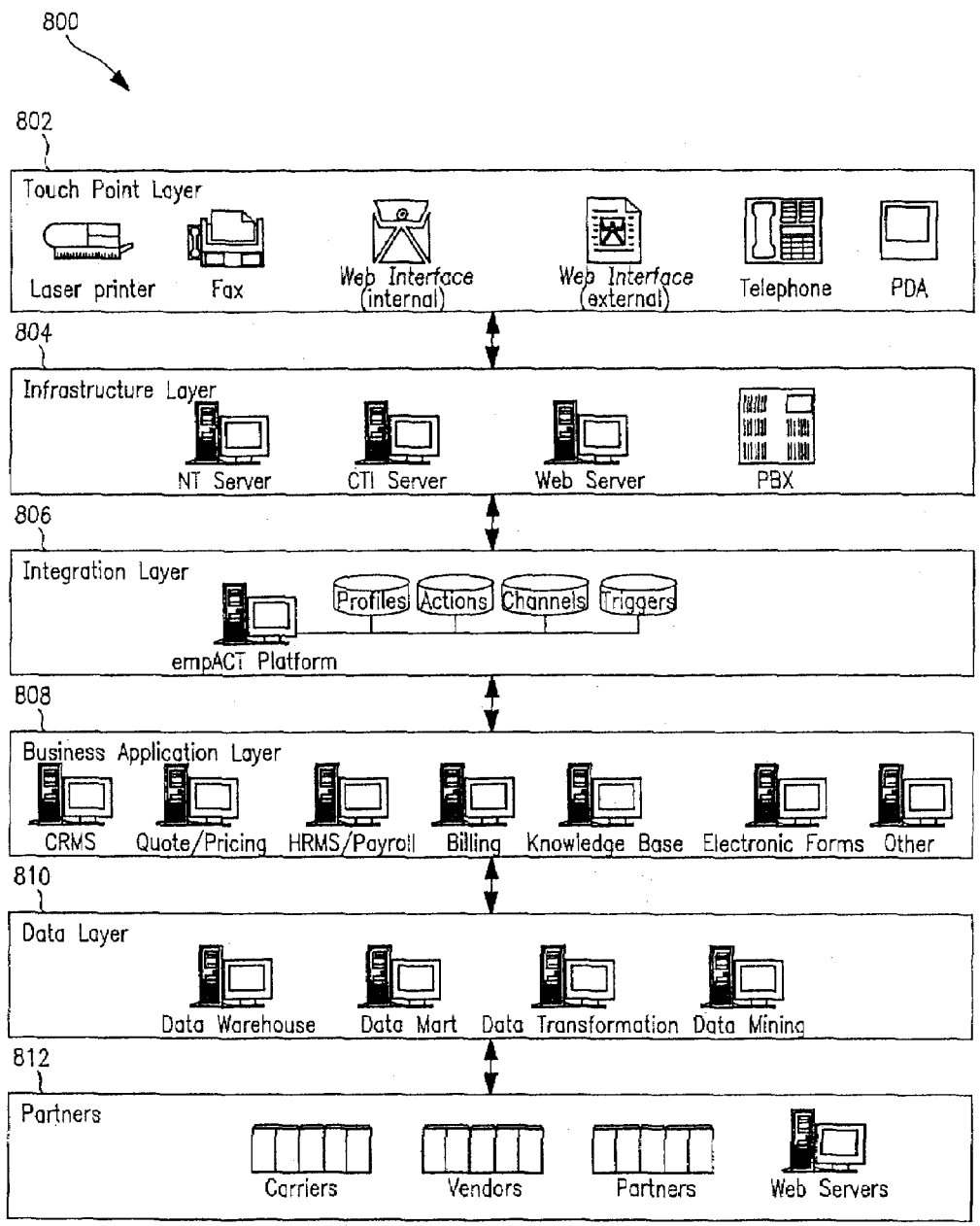
FIG. 8 is an illustration of network system architecture for a human resource management system constructed in accordance with the present invention.

FIG. 8 illustrates the network system architecture for another embodiment of a human resource management system 800 constructed in accordance with the present invention. The human resource management system 800 comprises an Internet-based, Web site interface that is provided by the developer of the system 800. The developer provides the Web site, for example, by hosting the pages and providing the links necessary for the human resource functions. Client companies (employers) utilize the processing that is accessed through the Web site to administer their company human resource management functions. Employees of the client companies access information concerning their personal company human resource information through the Web site.

The system 800 is constructed with a multi-tiered architecture. That is, based on a broad set of characteristics, each component or platform that performs a system function is designated to a given tier, or layer. Though the devices within each of these layers share common attributes (i.e. processes, properties of data, states of execution, etc.), they perform specific functional roles in support of a given business objective. Thus, FIG. 8 illustrates the various functional layers that are supported by the multi-tier architecture and provides a sampling of the corresponding systems within each layer.

The "Touch Point" layer 802 is the user interface front-end to the overall system 800 and thus is the point of interaction for clients as well as for internal constituencies, such as developer personnel. The Touch Point layer 802 may also be referred to as the application layer. The Touch Point layer renders to the user, be the user an internal or external constituency, a user-friendly composite of the underlying processes and data. The device types that comprise interface "touch points" to the system include printer devices, fax machines, Web ports, telephone interaction, and personal digital assistant (PDA) access portals. Other device types that may interface with network data devices are also suitable touch points and permit a variety of access schemes. The telephone access may be provided, for example, by voice interaction and VOXML techniques known to those skilled in the art. Each permissible interface (telephone, Web access, etc.) supports the business logic defined by the processes of the Integration layer 806 and the Business Application layer 808.

The processes of the Touch Point layer 802 are adapted to provide the following characteristics:

Point of Entry Validation: Validation of input fields against business rules prior to submitting transactions to the appropriate sub-system. The business rules are stored within the data model for the entire system. That is, the data model (described further below) implements the business rules, as selected by the system developer. The point of entry validation feature also accounts for tiered dependencies across systems—some data elements impact functional components differently from others.

Workflow: Support for a rudimentary queue mechanism for the delivery of data based on defined triggers. The triggering sub-system indexes data relationships and establishes an execution path to downstream components. The queues guarantee synchronized behavior, and thus the reliable workflow.

Customization: Affords the employer/employee users a high degree of modularity and flexibility in tailoring the ergonomics of their particular workspace.

Active Interface: This touch point characteristic relates to the "intelligence" built into the controls, fields, or events of the data model, as illustrated by the processing described further below.

Consistent Look and Feel: Each discrete application interface exhibits the same look and feel—i.e., consistent navigation metaphors, ergonomics, help screens, etc.

Co-branding: Though compelled to conform with a given vendor-partner's design templates and schema, the user interface of the system 800 will preserve the logic (primitives) behind the process flow of the system, as well as site and screen navigation metaphors.

The Infrastructure layer 804 includes the various servers that receive user requests for operation, including data entry and data retrieval. Thus, servers must be provided for each type of data format that will be supported by the system 800, such as Internet protocol, telephone (PBX) service, third-party system access, and the like. For example, one user interface will be through the Internet, which may be supported by a Web server or through a typical operating system interface, such as the Windows NT operating system by Microsoft Corporation. Another data type may require a PBX interface for telephone service. Other particular data types that may be supported can include proprietary data types, such as a CTI server for CTI data support products. The interaction between a client computer of the computer system 800 (via a given device of the Touch Point layer 802) and the system servers of the Infrastructure layer 804 is the initiating phase for any subsequent activity between the two parties. Thus, one or more servers support each Touch Point device type. Each Infrastructure layer 804 server implements data model business rules governing data capture and process flows.

A user request for a data operation is captured and passed as a message to the Integration Layer 806 without specifying the ultimate destination (i.e., the business application server) that will fulfill the request. The servers of the Infrastructure layer and Integration layer preferably communicate using the Transmission Control Protocol/Internet Protocol (TCP/IP) network protocol. Domain Name resolution is handled by the Internet Service Provider (ISP) at the client computer access point to ensure fast resolution of IP addresses to the developer's Web site (domain name). The infrastructure layer 804 includes redundant Web servers and primary and backup servers for each component of the Integration layer 806 and the Business Application layer 808.

The Integration layer 806 is a common messaging utility that functions as an "information bus" to provide disparate software platforms with a common library of Application Programming Interfaces (APIs) from which to accommodate both Web and non-Web server and presentation technologies. The Integration layer also acts as the "plug-in" utility for all external service providers. As such, it supports industry standard communication protocols (DCOM, CORBA, Java, etc). Thus, external or third-party service providers may choose from a variety of protocols through which they may communicate with the system 800. Thus, the actions launched by the Integration layer engines may involve messages according to COM, DCOM, CORBA, Java, WAP, secure socket, and other protocols.

The Integration layer 806 insulates each sub-system or component in the Business Application layer 808 from adjusting to changes with their peer systems. It ensures guaranteed, properly timed, and timely assembly of fragmented packets of information into atomic units of multi-process communications. More particularly, the Integration Layer includes a platform that provides a series of processing engines, each of which supports a collection of agent processes. For example, the Integration layer processing engines may implement processing of data categorized as either profiles, actions, channels, or triggers.

Each instance of an Integration layer 806 engine dispatches or launches agents or tasks based on its configuration and workload. The Integration layer platform knows to engage a particular agent process to execute a given task by referencing a data map or index of the various agents' responsibilities. The Integration layer platform has well-defined plug-in interfaces from which to populate/define information sources, rules, data elements, administration tasks, events, and resulting actions.

The "Business Application Layer" 808 contains the various applications (or processing engines of the respective applications) that perform the processing required to support a given business function. These application logic engines are responsible for performing the functions, enforcing appropriate sequencing rules, and determining the intermediate outcome for each of their processing steps. The applications are selected by the system developer, and configured to provide particular characteristics and functionality, as follows:

(1) To the extent possible, each application complies with the functional and technical criteria described above.

(2) Each system acts as a peer to the other members of the Business Application layer.

(3) The Business Application layer will not allow an application to build its own utilities; these services will be implemented and managed once in the system (e.g. workflow, messaging).

(4) Where additional functionality is needed, subsystems are purchased where possible and integrated into this layer. Thus, business information processing subsystems are delivered as components of the application layer, implementing a "building block approach" to the system design.

(5) Wherever feasible, each component is capitalized on existing platforms, hardware, and support infrastructure to take advantage of the economies of scale and to fully leverage the existing infrastructure.

(6) Each application will obtain data in response to requests, on the fly, from a common data store. Where this is not possible, the Integration layer ensures synchronization.

Figure 9:
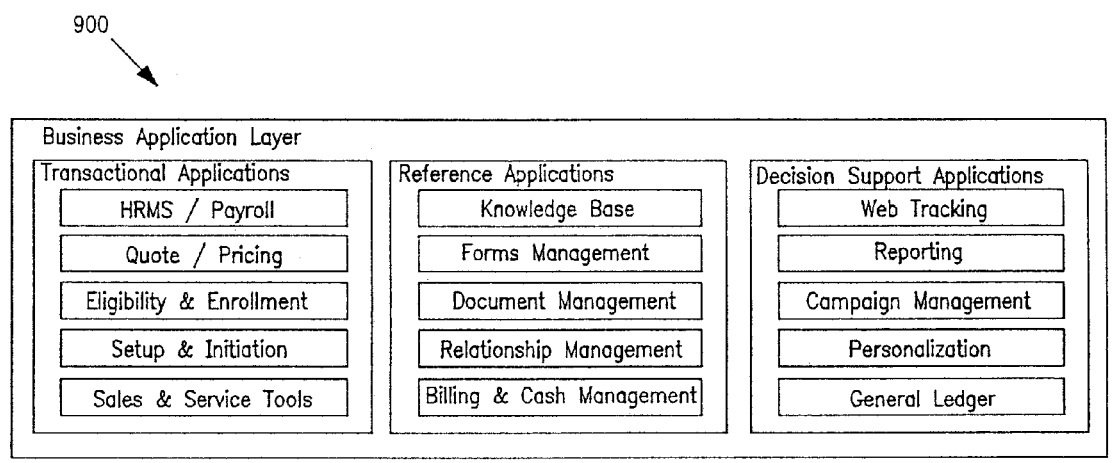
FIG. 9 is a representation of the programs provided in the Business Application layer of the network architecture illustrated in FIG. 8.

The applications provided through the Business Application layer 808 may be categorized as being either a transactional application, a reference application, or a decision support application. FIG. 9 shows this division of applications in the Business Application layer 900, and shows exemplary application types that fall into each category. For example, the transactional applications provide transactional capabilities of the system. The output of the transactional applications could be provided to clients or third party companies, as well as to downstream systems for further customer processing. To accomplish their objective, transactional applications typically "refer" to (or make use of) the data administered by reference applications. The reference applications specialize in the management of information that is leveraged by other platforms throughout the end-to-end processes. The information and information flow managed by these systems tends to change infrequently, yet require a complex set of business rules to ensure data/transactional integrity. The transactional applications produce output that is warehoused in the Data layer and is analyzed by the decision support applications. The decision support applications also serve to clarify and quantify abstract relationships between data elements and histogram data in transactional and reference data stores.

The "Data layer" 810 manages the relationship and integrity amongst and between vendor and partner data with the system metadata. The Data layer performs two different data storage functions. First, the Data layer provides a common "intermediary" database that aggregates data from product partners. The product partners supply the business applications that are integrated by the system developer. Where necessary, the intermediary database function provides a common semantic between dissimilar schemas of the business applications and performs a data normalization function. The intermediary database reflects the data model attributes as selected by the system developer. Normalization, or automatic conversion from the common data store schema into the different data representations required by the business applications, is inevitable. It is, in fact, required to assure consistency of all other layered interfaces.

The second functional aspect of the Data layer is to maintain operational data stores to support the client business applications. Each contains business rules governing data capture and basic process flows. Requests captured are passed as a message, or as event object defining the properties of said data triggering the event and the operations allowed on that data, to the appropriate engine to fulfill a given request. FIG. 8 shows that, in one embodiment, the functions of the Data layer 810 are provided by a Data Warehouse computer or process, a Data Mart process, a Data Transformation process, and a Data Mining process.

The Partners layer 812 involves systems of the companies who supply the business applications software and support interfaces between system users the system. For example, some of the companies in the Partners layer comprise carriers, such as common voice telephone service providers who provide a path to receive changes and provide communications between the Touch Point layer 802 and the Infrastructure layer. That is, the carriers simply transport data into and out of the system for use by the business application processes. Other participants in the Partners layer comprise vendors, who provide business applications programs that are supported by the developer of the system 800. Other Partners layer participants comprise partner companies. The partner companies have a close and more pervasive relationship with the system constructed by the system developer. Thus, the data model on which the system 800 is constructed more closely reflects the business rules and data model employed by the systems of the partners, as compared with the less closely aligned systems of the vendors.

Network Addressing Scheme

Figure 10:
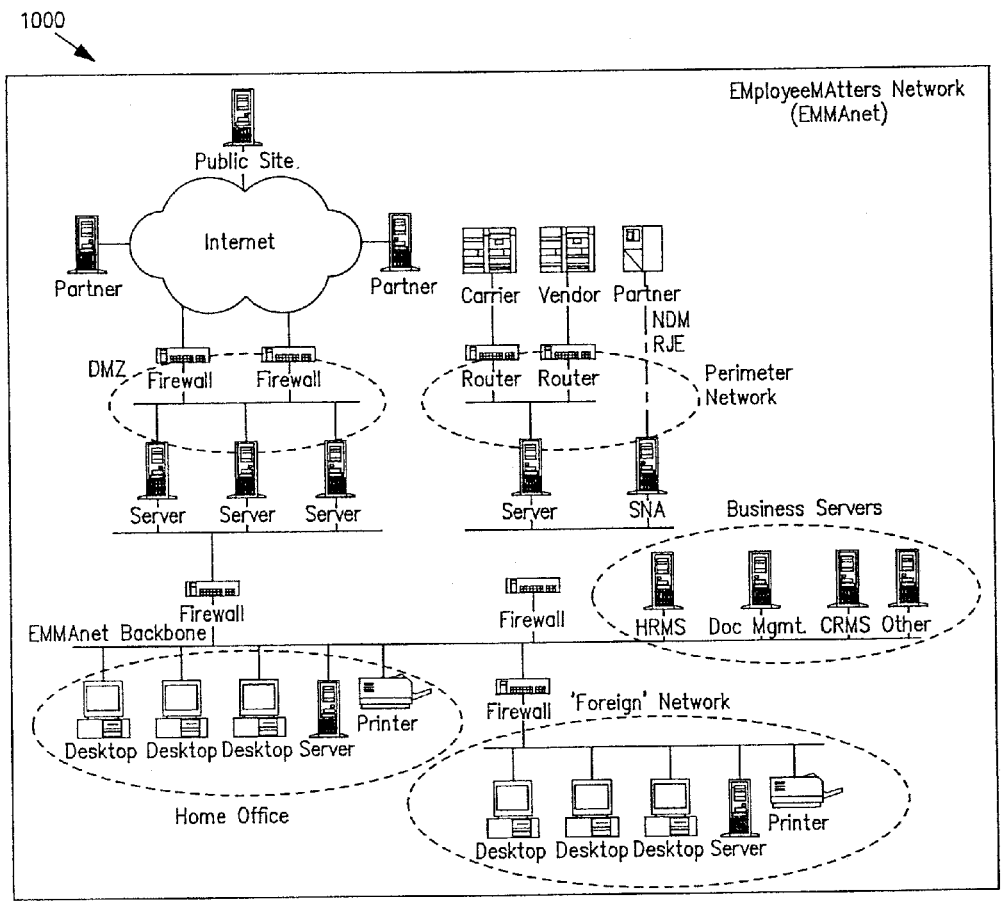
FIG. 10 is a representation of the network addressing scheme employed in the system of FIG. 8.

The multiple tier architecture of the system 800 described above is further illustrated in the FIG. 10 drawing of network addressing scheme. The network diagram 1000 shows the public site, the Web interface through which customers (the employer companies) and their employees gain access to the business applications described above. The connection of the system to the outside world is over the Internet and through a security firewall, shown as two redundant firewall devices. Thus, employers and their employees may submit requests for information about their respective information in the system, or may simply want to obtain answers to questions or otherwise make inquiries, through the public site. System partners also gain access over the Internet and through the firewall.

The server machines of the infrastructure layer next receive process such client requests, and then interface with the system backbone, after passing through a firewall machine. The carriers, vendors, and partners of the Partners layer (FIG. 8) connect through routers to the business applications and then to the system backbone. The business applications of the Business Application layer also are shown connected to the system backbone. Finally, other various "touch point" devices are shown directly connected to the system backbone.

Network Security

Figure 11:
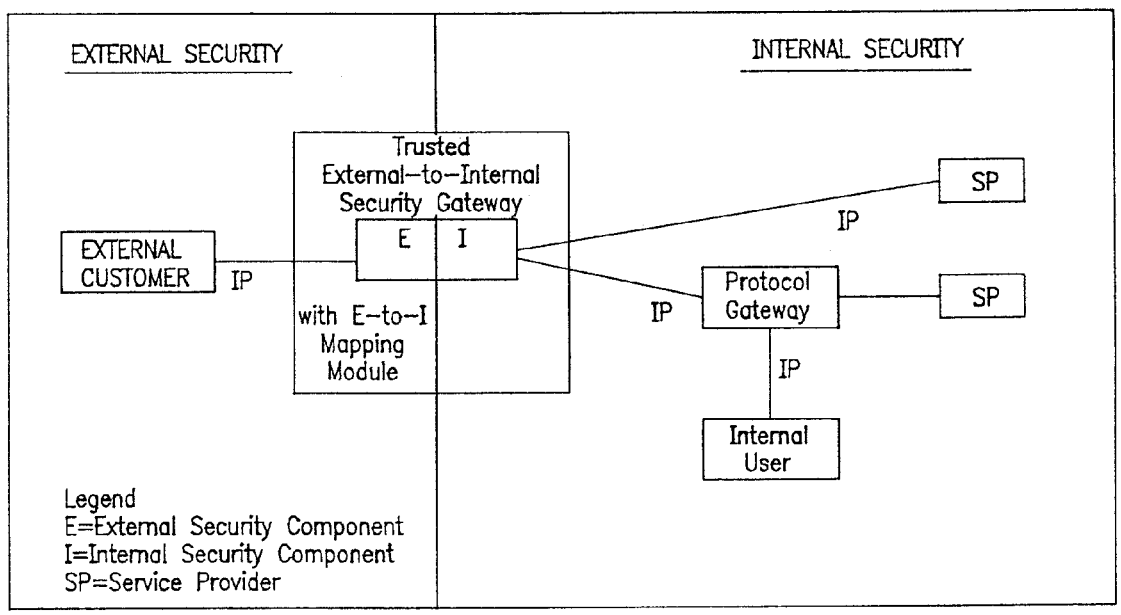
FIG. 11 is a diagram representation of the system security between external and internal machines of the FIG. 8 system.

Security of the transactions is of vital importance to the system. FIG. 11 shows a diagram 1100 of the security between external (client) machines and the machines that are internal to the system. First, there is a known-secure, or "trusted", security gateway. The security gateway contains an external-to-internal security-mapping module with integrated external (E) and internal (I) components. External customers, being either employer personnel or their employees, communicate using Internet protocol (IP) with the external component (E) of the security mapping module. The internal component (I) trusts the external component (E) to authenticate clients. The external component E trusts the internal component I to access the right service provider (SP) or trusted intermediary server, to protect client identity and request data, and to protect response data. The system developer uses the security gateway and external/internal architecture to prevent external users (clients) from accessing internal service providers directly, and then only via a controlled access path. External and internal security are separate domains, though they supplement each other, i.e. they may use the same or different security mechanisms.

User Interface

Figure 12:
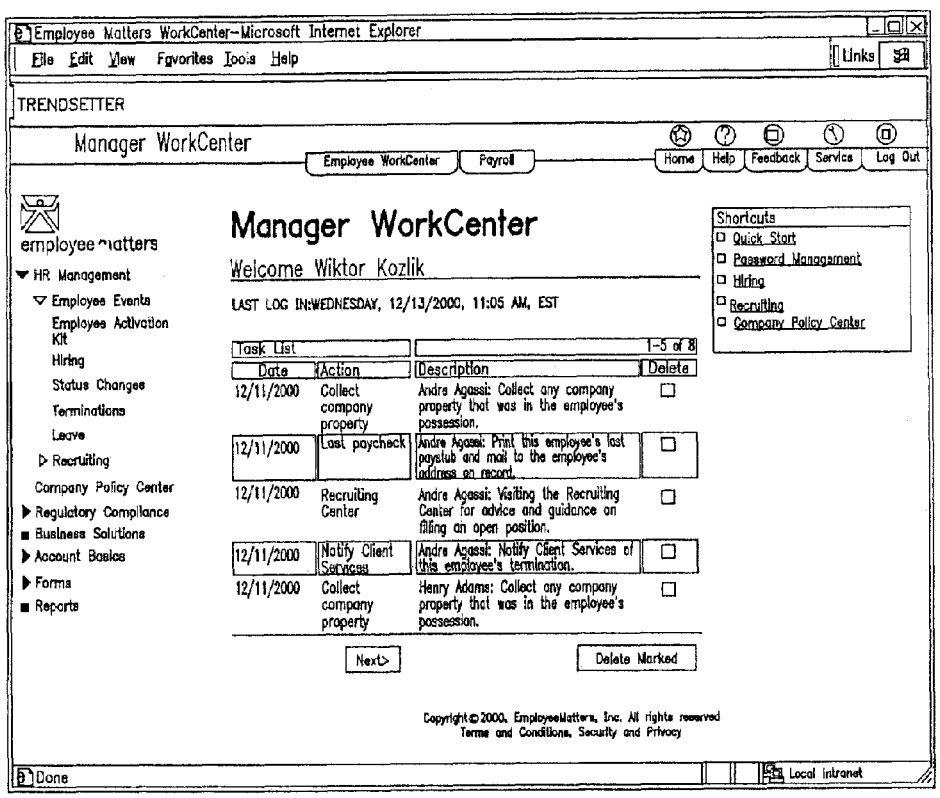
FIG. 12 is an illustration of a Manager Work Center display page of the graphical user interface provided by the system illustrated in FIG. 8.

The architecture and functionality described above is accessed through a Web interface that provides information to a client through the now-familiar Web browser interface. FIG. 12 shows a Manager WorkCenter display page 1200 that an authorized person would see upon logging in to the system and being verified as an authorized person. A vertical frame along the left side of the display page provides menu options. A centrally located workspace area shows the authorized manager's last date and time of login. The system then provides a task list, which shows tasks that the authorized manager has previously input. The authorized manager may characterize the tasks according to an action descriptor, may include a description of each task, and may check a box upon task completion, for deleting entries from the task list.

Figure 13:
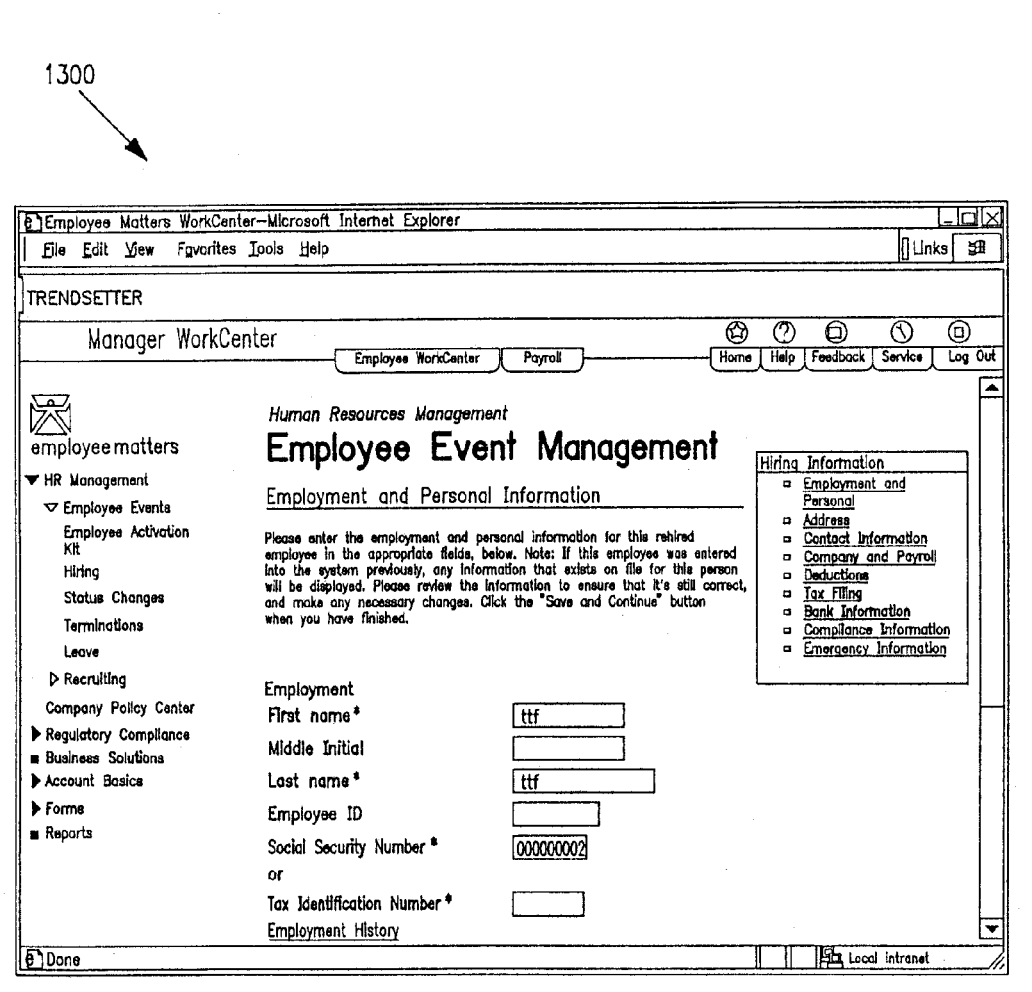

FIG. 13 shows the Manager Work Center function with the display page 1300 set to an Employee Event Management function. FIG. 13 shows how the business applications (in this case, an application for employee management) guide the user through tasks that must be performed. The application, as illustrated in FIG. 13, will elicit the appropriate input from the user by providing text boxes and the like in which data is received.

An employee, to whom the client company does not wish to permit access for data handling business applications, for example, would see the data screen illustrated in FIG. 14. This display page 1400 is labeled "Employee Work Center". FIG. 14 shows the type of data that may be viewed by an employee for this payroll data page, such as residence address, employee number, social security number, and the like. The vertical frame along the left side of the display page shows other menu items for the employee to call up.

Event Data Model

The business rules implemented by the system 800 incorporate automatic recognition of, and processing for, events that occur to employees and to companies. That is, triggering events such as user entry of data changes or outside occurrences such as particular calendar dates will automatically initiate database processes. These triggering events may comprise, for example, changes in income as a result of promotions or pay raises, necessitating a change in payroll processing and perhaps changes in tax consequences. Other changes may comprise an employee change in residence location, or the addition of a new child, or a change in the employee's health situation. The system 800 automatically detects and responds to such events, and launches processes that take action or elicit any additional information that is needed to maintain the data store of the system with current information. After any updates to the system data store are completed, the updated data will be immediately available to any business application that requests the data. That is, the Data layer of the system maintains a central data store for employee data to provide a repository from which data is provided as needed, in response to a request by a business application.

The Data layer processes that retrieve the data from the central store for a business application will automatically determine any different format that might be required by the business application and will make the data conversion. Thus, data is not converted and stored into the various different formats that might be needed by each of the business applications. Rather, data conversion is executed on the fly, and does not occur until a business application has requested the data. For example, an employee may change residence address. There may be many of the business applications that require employee address, and each of them may need the employee address in a slightly different format. The system 800 (FIG. 8) does not store a differently formatted employee address for each business application that is used in the system. Instead, the system stores one version of the employee address. When an application requires employee address, the system simply goes to the central data store, and a process automatically formats the address data into a form that is acceptable to the requesting application.

Figure 15:
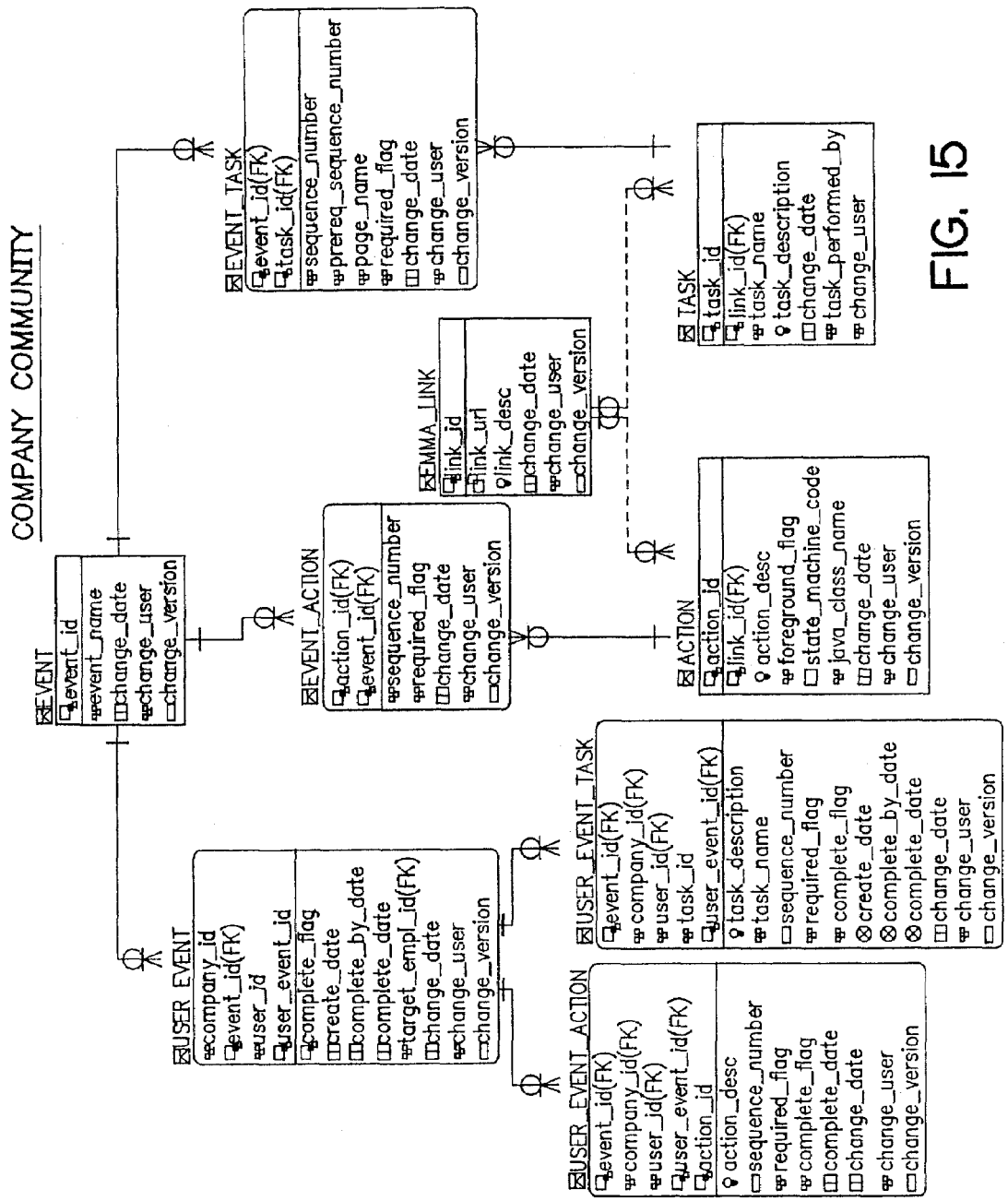
FIG. 15 is a representation of the Event data model used in the system illustrated in FIG. 8.

As noted above, the data models of the system 800 reflect the business rules and methodology employed by the system. Accordingly, the system data model includes an event data structure that models the company, its employees, and the events that transpire in their lives (and that require data updates). FIG. 15 is labeled "Company Community" and illustrates the data model or data objects that are related to events. In the relational data base model of the system, each of the boxes illustrated in FIG. 15 correspond to tables of related data types, with data cells that may be shared in common among multiple tables.

FIG. 15 shows that, for a data record named Event, there are associated data records called Event_Task, Event_Action, and User_Event. Thus, each Event that is recognized by the system will be associated with a user event, an event task, and an event action. As noted above, the Events that are recognized and processed by the system include events such as employee pay raises, dates on which the end of the tax year occurs, changes in marital status, and changes in the number of employee dependents (household size). Each Event_Action is associated with one or more Actions, comprising update processes to the central store database such as the data operations required to effectuate the update. Each Event_Task is associated with one or more Tasks, comprising the data records that must be updated to effectuate the event update. Thus, for an event comprising a change in the number of employee dependents, the associated Event_Action may include identifying each business application that maintains an off-site data store to determine if it requires updated data as a result of the event. The associated Event_Task may comprise changing the number of payroll tax withholding amount and increasing the amount of employee life insurance.

Each User_Event is, in turn, associated with a User_Event_Task and a User_Event_Action. The User_Event_Task is analogous to the Event_Task, but for a particular individual employee. Thus, the Event_Task table is a list of data items that correspond to data items that are affected by a given event of the Event table, while the User_Event_Task table is a list of event tasks that need to be changed for a particular user (employee) in response to a particular User_Event. Similarly, the User_Event_Action is analogous to the Event_Action, but for a particular employee, so that the User_Event_Action table is a list of data actions that need to be performed for a given User_Event that occurs to a particular employee.

Event Processing

Figure 16:
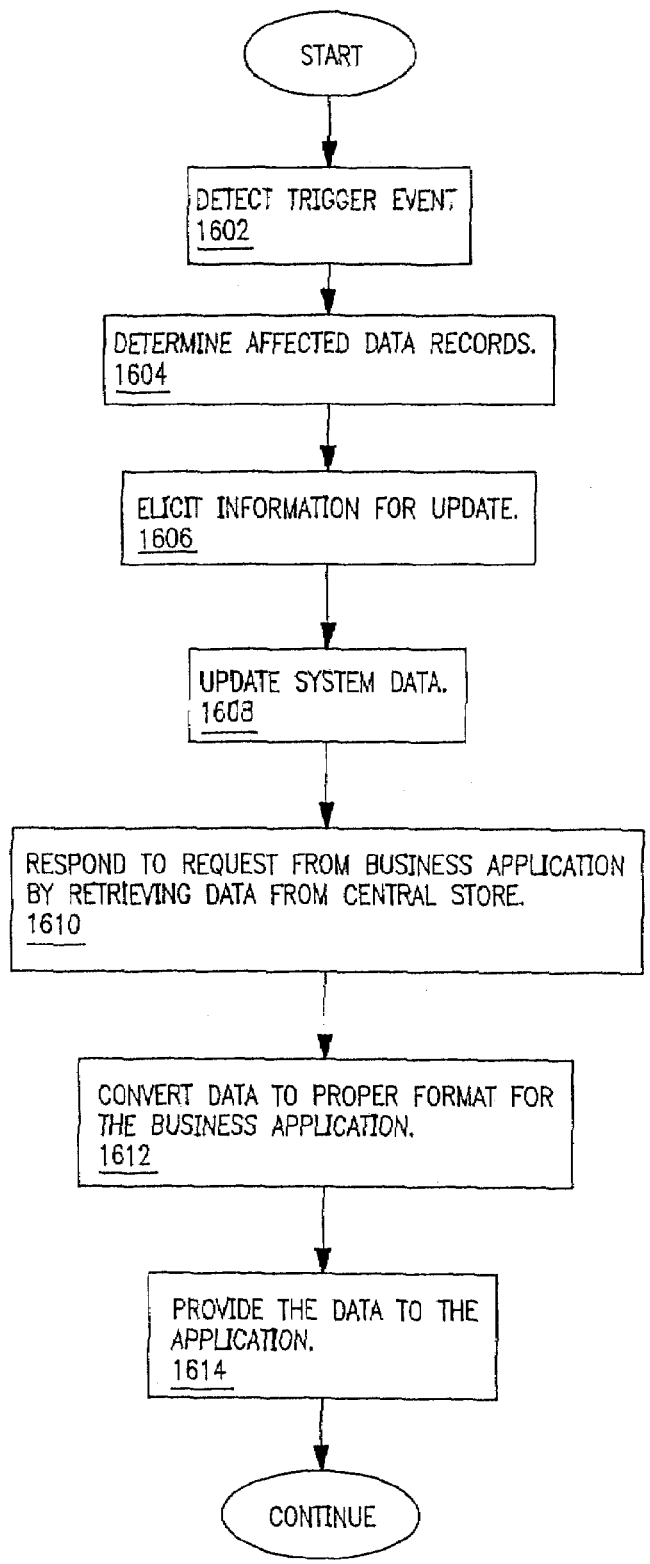
FIG. 16 is a flow diagram representation of the processing for triggering events in the system illustrated in FIG. 8.

Thus, the system 800 is driven by triggering events that initiate data processes to update the data store, thus ensuring that business processes that receive requested data through the Data layer will receive updated information. FIG. 16 is a flow diagram that illustrates the processing of the system in response to such triggering events.

In the first operation, indicated by the FIG. 16 flow diagram box numbered 1602, the system detects a triggering event. As noted above, the triggering event may be an automatically detected event such as a calendar year change (signifying the end of a tax year, for example), or the triggering event may be a user-entered event such as an additional dependent due to the birth of a child or a change in residence (which may necessitate changes in state tax computation and other regulatory adjustments, in addition to a change in the data store entry for the employee's address). Processes of the Data layer attend to detecting and recognizing such triggering events.

Next, represented by the flow diagram box numbered 1604, the system determines the affected data records. For example, processes of the Data layer will detect that an employee has entered a new address, indicating a change in residence, and will automatically determine that the new state of residence will require different tax computation and changes in health care coverage and the like. Similarly, processes of the Data layer will detect that the end of the calendar year has passed, and will automatically initiate computation of tax calculations and will automatically generate tax forms and other documentation necessary to provide for each employee.

In some cases, the system may need to obtain additional information from the employee. The system will automatically query the employee for such information, as indicated by the flow diagram box numbered 1606. Thus, when an employee at the user interface screen (FIG. 14) indicates that the employee has an additional dependent to report, the system will automatically generate a query screen that requests the information needed by the system to update that employee's records. For example, the system will automatically request the dependent's name, age, sex, birth date, and so forth. Any such additional information is stored into the data store of the system, as represented by the FIG. 16 flow diagram box numbered 1608. In this way, the system automatically updates the data store of the Data layer, so that all data records (tables) that are affected by a triggering event are kept current.

After the data is updated and the processing of box 1608 is completed, the system is ready to respond to business application requests for data with current information. As noted above, a business application may request a data record, in response to an employee query or an authorized user query from an appropriate user interface screen. The Data layer receives the data request, determines the data records that contain relevant information, and retrieves the requisite data from the system data store. This processing is represented by the FIG. 16 flow diagram box numbered 1610. The Data layer then reformats or converts the retrieved data into a format that is compatible with the data schema of the requesting business application. This processing is represented by the flow diagram box numbered 1612. At the flow diagram box numbered 1614, the system Data layer then provides the converted data to the requesting business application. As discussed above, the data requests to which the Data layer responds may comprise, for example, a business application that is executing automatic processing (such as generating payroll checks) or that is responding to user requests (such as showing an employee the health care insurance coverage on file for the employee).

In this way, the system 800 provides a human resource (HR) management system that integrates business applications from a variety of sources and provides a hosted Web site interface and subscription service through which employees of subscribing companies may update and retrieve their data, and may be redirected to Web sites of vendor or partner companies who provide the actual specialized HR processing for the companies. Thus, the system provides a network implementation of HR services that is easily scalable between relatively small companies who want the latest HR services but cannot afford the cost of developing a unique system solution with a consulting firm and cannot afford the cost of more sophisticated and complex packages from the large software vendors.

Figure 17:
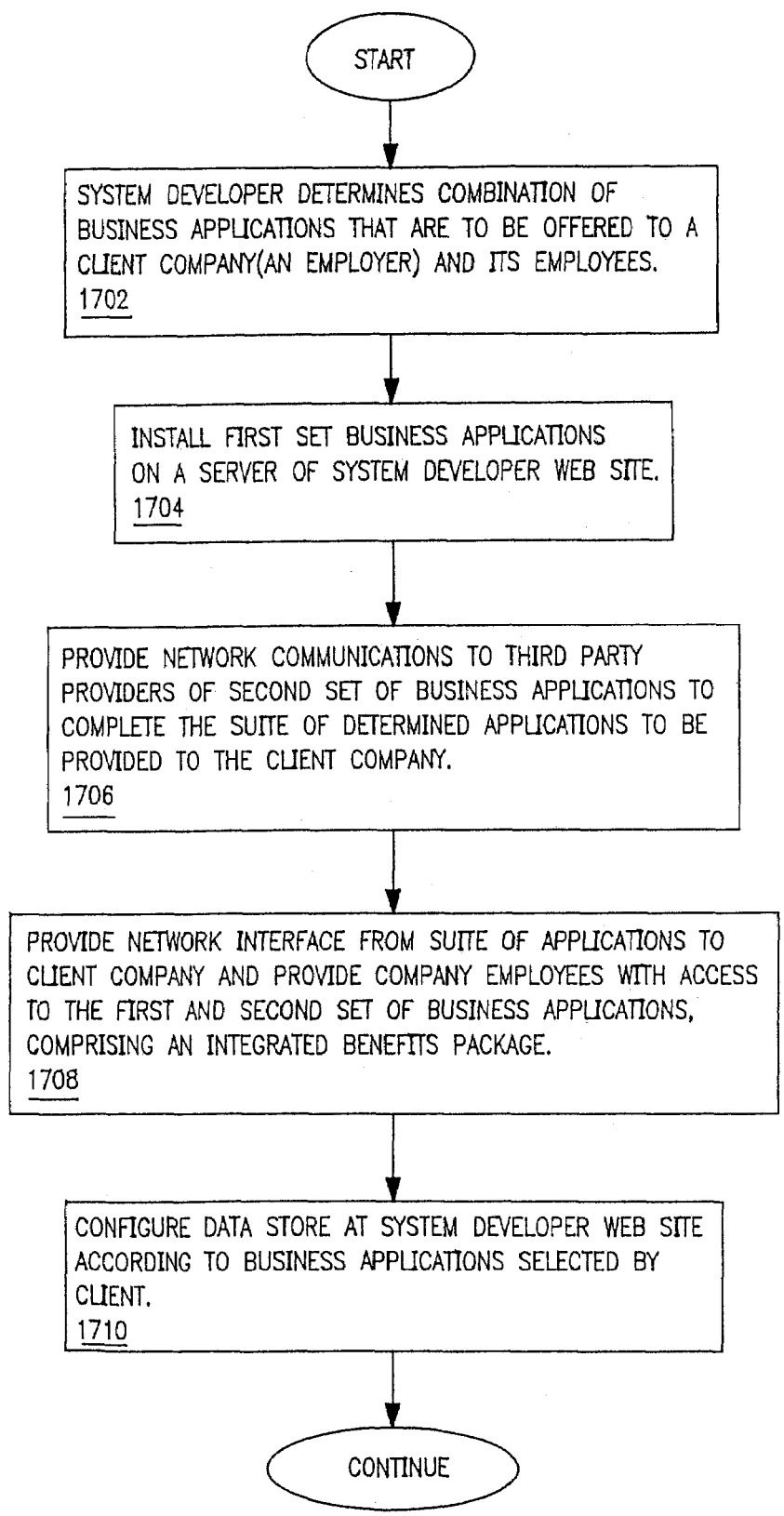
FIG. 17 is a flow diagram representation of the development process that results in the human resource management systems constructed in accordance with the present invention and described in FIGS. 1 through 16.

FIG. 17 shows a flow diagram representation of the system development process described above that results in a Web-hosted HR management system constructed in accordance with the present invention. First, as represented by the flow diagram box numbered 1702, the system developer determines the combination of business applications that are to be offered to the client companies (the employers) and to the employees of the client companies. Next, the system developer installs a first set of business applications on one or more network servers of the system developer's network site, such as a Web site. The first set of applications comprise those applications that will be installed at the Web site provided by the system developer for the HR system. This operation is represented by the flow diagram box numbered 1704.

The system developer then provides network communications to one or more third party providers of a second set of business applications, thereby completing the suite of business applications determined by the system developer as appropriate to be offered to the client companies. The third party business applications thus are not hosted by the system developer, but rather the clients of the system developer will be redirected to the third party network sites for such business application processing. This operation is represented by the flow diagram box numbered 1706. The system developer then provides a network interface from the suite of applications to the client companies and the respective company employees, so they may access the first and second set of business applications, thereby comprising an integrated human resource benefits package. The network interface may comprise, for example, an Internet domain (Web site) from which users may view display pages from any conventional Web browser program. This operation is represented by the FIG. 17 flow diagram box numbered 1708.

As a final operation of the process, represented by box 1710, the system developer configures a data store at the system developer Web site according to business applications selected by the respective client. That is, each client may select business applications to be offered to its employees, and then the system processing will configure the data store for employees of that client to implement that selection. For example, one client company may select a dental health insurance business application for its employees, while another client company may decide not to select the dental health insurance. The system will configure the respective data stores by eliciting information from employees of the first client company to populate its data store for information to be used by the dental health insurance business application, but will not elicit such information from employees of the second client company when the data store of those employees is configured.

If desired, the data configuration process may include a determination of pricing of the integrated benefits package to the client company and its employees. This price determination preferably binds the third party providers to provide the second set of remotely hosted business applications for a set period of time, thereby insulating the client company and its employees from uncertainty over continued availability of these components of the integrated system. The pricing may be automatically configured into the data store and system processing of the system. For example, referring to the first client (with dental health insurance) and second client described above, it is anticipated that the first set of business applications of the system developer will include employee payroll and tax filing processing, among others. Therefore, if an employee of the first client company elects to receive dental health insurance coverage, then the system will configure the data store for those employees of the client company by eliciting the proper information, and will automatically deduct an appropriate amount of funds from payroll checks for the electing employees to account for funding the dental health insurance. Other appropriate processing may be carried out, such as any special tax filings that may be needed as a result of the employee's dental health insurance election. The employees of the second client company, which did not offer dental health insurance, will not be subjected to data queries to elicit data store information related to dental coverage, and their payroll processing will not include dental health insurance coverage payroll deductions. Such configuration processing is transparent to the client companies and to their employees, so that the mixture of business applications offered to multiple client companies (and their respective employees) through the on-line network access appear as a single integrated product offering.

Because the payroll processing business application is installed on the system developer's network site, the automatic payroll deduction, tax filing, and other such processing is easily implemented in an efficient and secure manner. Other data store information for remotely hosted or processed third party business applications will be elicited and delivered to the respective third party providers, in accordance with client company offerings and employee elections. The payroll processing may be implemented pursuant to processing such as offered by, for example, the company called Performance Software, Inc. of Elmwood Park, Ill., USA. The tax filing processing may be implemented in accordance with processing such as offered by, for example, the company called Payroll Tax People, Inc. (see www.payrolltaxpeople.com). Other offerings that provide similar functionality are suitable and will occur to those skilled in the art.

Thus, the present invention provides an integrated business process and system for remotely managing business and employee administration services. One skilled in the art will appreciate that the present invention can be carried out in other ways and practiced by other than the described embodiments, yet not departing from the spirit and essential characteristics depicted herein. The present embodiments therefore should be considered in all respects as illustrative, and the present invention is limited only by the claims that follow.

We claim:

1. A computer implemented method of integrating a plurality of human resource (HR) services, comprising:
   receiving a data item associated with a customer;
   identifying an event from the data item;
   alerting the customer of a first HR service requiring execution after identifying the event;
   automatically determining, by a computer, the first HR service and a second HR service of the plurality of HR services affected by the event,
   wherein the customer holds subscriptions to the first HR service and the second HR service,
   wherein determining the first HR service and the second HR service is based on the subscriptions, and
   wherein the subscriptions allow the customer access to the first HR service and the second HR service;
   initializing a first update task and a second update task, wherein initializing the first update task and the second update task are triggered by the event;
   dividing, using the computer, the first update task and the second update task, wherein the first update task is placed into a critical list and the second update task is placed into a non-critical list;
   prioritizing, using the computer, the first update task as a critical task after placing the first update task into the critical list;
   prioritizing, using the computer, the second update task as a non-critical task after placing the second update task into the non-critical list;
   scheduling execution of the first update task and the second update task based on priority of the critical task and the non-critical task;
   converting the data item to a first format accepted by the first HR service;
   converting the data item to a second format accepted by the second HR service;
   executing, based on the event identified, the first update task to update the first HR service, wherein executing the first update task comprises sending the data item in the first format to the first HR service; and
   executing, based on the event identified, the second update task to update the second HR service,
   wherein executing the second update task comprises sending the data item in the second format to the second HR service, and
   wherein the first HR service and the second HR service form a portion of an HR management system for the customer.

2. The computer implemented method of claim 1, wherein the second priority exceeds the first priority and the second update task is executed before executing the first update task.

3. The computer implemented method of claim 1, wherein the first update task and the second update task are executed synchronously.

4. The computer implemented method of claim 1, wherein a third update task and the fourth update task are executed asynchronously.

5. The computer implemented method of claim 1, further comprising:
   sending a request to the customer for an additional data item regarding the event;
   receiving the additional data item; and
   converting the additional data item to the first format,
   wherein executing the first update task further comprises sending the additional data item in the first format to the first HR service.

6. The computer implemented method of claim 1, wherein the event is at least one selected from a group consisting of a change in marital status, a change in a health status, a change in a retirement status, a change in location, a change in financial compensation, a change in address, a change in dependents of an employee of the customer.

7. The computer implemented method of claim 1, wherein the first HR service is provided by at least one selected from a group consisting of a health insurance provider, disability insurance provider, and a life insurance provider.

8. The computer implemented method of claim 1, further comprising:
   receiving a selection from the client, wherein the selection comprises the first HR service and the second HR service; and
   installing the first HR service and the second HR service.

9. The computer implemented method of claim 8, further comprising:
   installing the first HR service and the second HR service in the HR management system before receiving the data item.

10. The computer implemented method of claim 1, wherein the first HR service is an income tax preparation service.

11. The computer implemented method of claim 1, wherein the first HR service is provided by a payroll service provider.

12. A computer readable medium storing instructions for integrating a plurality of human resource (HR) services, the instructions comprising functionality to:
    receive a data item associated with a customer;
    identify an event from the data item;
    alert the customer of a first HR service requiring execution after identifying the event;
    automatically determine, using a computer, the first HR service and a second HR service of the plurality of HR services affected by the event, wherein the customer holds subscriptions to the first HR service and the second HR service, wherein determining the first HR service and the second HR service is based on the subscriptions, and wherein the subscriptions allow the customer access to the first HR service and the second HR service;
    initialize a first update task and a second update task, wherein initializing the first update task and the second update task are triggered by the event;
divide, using the computer, the first update task and the second update task, wherein the first update task is placed into a critical list and the second update task is placed into a non-critical list;
prioritize, using the computer, the first update task as a critical task after placing the first update task into the critical list;
prioritize, using the computer, the second update task as a non-critical task after placing the second update task into the non-critical list;
schedule execution of the first update task and the second update task based on priority of the critical task and the non-critical task;
convert the data item to a first format accepted by the first HR service;
convert the data item to a second format accepted by the second HR service;
execute, based on the event identified, the first update task to update the first HR service,
wherein executing the first update task comprises sending the data item in the first format to the first HR service; and
execute, based on the event identified, the second update task to update the second HR service,
wherein executing the second update task comprises sending the data item in the second format to the second HR service, and
wherein the first HR service and the second HR service form a portion of the HR management system for the customer.

13. The computer readable of claim 12, wherein the second priority exceeds the first priority and the second update task is executed before executing the first update task.

14. The computer readable medium of claim 12, wherein the first update task and the second update task are executed synchronously.

15. The computer readable medium of claim 12, wherein a third update task and the fourth update task are executed asynchronously.

16. The computer readable medium of claim 12, the instructions further comprising functionality to:
send a request to the customer for an additional data item regarding the event;
receive the additional data item; and
convert the additional data item to the first format,
wherein executing the first update task further comprises sending the additional data item in the first format to the first HR service.

17. The computer readable medium of claim 12, wherein the event is a change in marital status, a change in a health status, a change in a retirement status, a change in location, a change in financial compensation, a change in address, a change in dependents of an employee of the customer.

18. The computer readable medium of claim 12, wherein the first HR service is provided by at least one selected from a group consisting of a health insurance provider, disability insurance provider, and a life insurance provider.

19. The computer readable medium of claim 12, the instructions further comprising functionality to:
receive a selection from the client, wherein the selection comprises the first HR service and the second HR service; and
install the first HR service and the second HR service.

20. The computer readable medium of claim 18, the instructions further comprising functionality to:
install the first HR service and the second HR service in the HR management system before receiving the data item.

21. The computer readable medium of claim 12, wherein the first HR service is an income tax preparation service.

22. The computer readable medium of claim 12, wherein the first HR service is provided by a payroll service provider.

23. An apparatus for integrating a plurality of HR services, comprising:
means for receiving a data item associated with a customer;
means for identifying an event from the data item;
means for alerting the customer of a first HR service requiring execution after identifying the event;
means for automatically determining, by a computer, the first HR service and a second HR service of the plurality of HR services affected by the event, wherein the customer holds subscriptions to the first HR service and the second HR service, wherein determining the first HR service and the second HR service is based on the subscriptions, and wherein the subscriptions allow the customer access to the first HR service and the second HR service;
means for initializing a first update task and a second update task,
wherein initializing the first update task and the second update task are triggered by the event;
means for dividing, using the computer, the first update task and the second update task, wherein the first update task is placed into a critical list and the second update task is placed into a non-critical list;
means for prioritizing, using the computer, the first update task as a critical task after placing the first update task into the critical list;
means for prioritizing, using the computer, the second update task as a non-critical task after placing the second update task into the non-critical list;
means for scheduling execution of the first update task and the second update task based on priority of the critical task and the non-critical task;
means for converting the data item to a first format accepted by the first HR service;
means for converting the data item to a second format accepted by the second HR service;
means for executing, based on the event identified, the first update task to update the first HR service,
wherein executing the first update task comprises sending the data item in the first format to the first HR service; and
means for executing, based on the event identified, the second update task to update the second HR service,
wherein executing the second update task comprises sending the data item in the second format to the second HR service, and
wherein the first HR service and the second HR service form a portion of the HR management system for the customer.

24. The apparatus of claim 23, wherein the event is at least one selected from a group consisting of a change in marital status, a change in a health status, a change in a retirement status, a change in location, a change in financial compensation, a change in address, a change in dependents of an employee of the customer.

25. The apparatus of claim 23, wherein the first HR service is provided by at least one selected from a group consisting of a health insurance provider, disability insurance provider, and a life insurance provider.

26. The apparatus of claim 23, further comprising:
means for receiving a selection from the client, wherein the selection comprises the first HR service and the second HR service; and
means for installing the first HR service and the second HR service.

27. The apparatus of claim 26, further comprising:
means for installing the first HR service and the second HR service in the HR management system before receiving the data item.

28. The apparatus of claim 23, wherein the first HR service is a tax preparation service.

29. The apparatus of claim 23, wherein the first HR service is provided by payroll service provider.

30. A system for integrating a plurality of human resource (HR) services, comprising:
an interface tier executing on a computer and configured to:
receive a data item associated with a customer and identify an event based on the data item; and
alert the customer of a first HR service requiring execution after identifying the event;
an integration tier executing on the computer, operatively connected to the interface tier, and configured to:
initialize a first update task and a second update task in response to the event;
a data transformation tier executing on the computer, operatively connected to the integration tier, and configured to:
divide the first update task and the second update task, wherein the first update task is placed into a critical list and the second update task is placed into a non-critical list;
prioritize the first update task as a critical task after placing the first update task into the critical list;
prioritize the second update task as a non-critical task after placing the second update task into the non-critical list;
schedule execution of the first update task and the second update task based on priority of the critical task and the non-critical task;
wherein the first update task converts the data item into a first format after ordering execution of the first update task, and
wherein the second update task converts the data item into a second format after ordering execution of the second update task;
the first HR service of the plurality of HR services operatively connected to the data transformation tier, and configured to:
receive the data item in the first format and be updated by the first update task,
wherein the first format is native to the first HR service,
wherein the customer holds a subscription to the first HR service,
wherein the configuration is based on the subscription to the first HR service, and
wherein the subscription to the first HR service allows the customer access to the first HR service; and
a second HR service of the plurality of HR services operatively connected to the data transformation tier, and configured to:
receive the data item in the second format and be updated by the second update task, wherein the second format is native to the second HR service,
wherein the customer holds a subscription to the second HR service, and
wherein the configuration is based on the subscription to the second HR service, and
wherein the subscription to the second HR service allows the customer access to the second HR service.

31. The system of claim 30, further comprising:
a translation rules repository storing rules for converting the data item.

32. The system of system 30, wherein the event is at least one selected from a group consisting of a change in marital status, a change in a health status, a change in a retirement status, a change in location, a change in financial compensation, a change in address, a change in dependents of an employee of the customer.

33. The system of claim 30, wherein the first HR service is provided by at least one selected from a group consisting of a health insurance provider, disability insurance provider, and a life insurance provider.

34. The system of claim 30, wherein the first HR service is an income tax preparation service.

35. The system of claim 30, wherein the first HR service is provided by a payroll service provider.

* * * * *